United States Patent
Fortusini et al.

(10) Patent No.: US 10,353,157 B2
(45) Date of Patent: Jul. 16, 2019

(54) BACKPLANE OPTICAL CONNECTORS AND OPTICAL CONNECTIONS INCORPORATING THE SAME

(71) Applicant: Corning Optical Communications LLC, Hickory, NC (US)

(72) Inventors: Davide Domenico Fortusini, Ithaca, NY (US); James Phillip Luther, Hickory, NC (US); Jerald Lee Overcash, China Grove, NC (US)

(73) Assignee: Corning Optical Communications, LLC, Hickory, NC (US)

( * ) Notice: Subject to any disclaimer, the term of this patent is extended or adjusted under 35 U.S.C. 154(b) by 283 days.

(21) Appl. No.: 14/950,465

(22) Filed: Nov. 24, 2015

(65) Prior Publication Data
US 2017/0146750 A1    May 25, 2017

(51) Int. Cl.
*G02B 6/40* (2006.01)
*G02B 6/38* (2006.01)
(Continued)

(52) U.S. Cl.
CPC .......... *G02B 6/403* (2013.01); *G02B 6/3882* (2013.01); *G02B 6/3885* (2013.01); *G02B 6/3886* (2013.01); *G02B 6/3893* (2013.01); *G02B 6/3897* (2013.01); *G02B 6/4206* (2013.01); *G02B 6/4292* (2013.01); *G02B 6/43* (2013.01); *G02B 6/32* (2013.01); *G02B 6/3821* (2013.01)

(58) Field of Classification Search
CPC .... G02B 6/403; G02B 6/3882; G02B 6/3893; G02B 6/4206; G02B 6/4292
See application file for complete search history.

(56) References Cited

U.S. PATENT DOCUMENTS 3,603,357 A * 9/1971 Drummond ............... B21F 1/02
140/147
4,253,730 A * 3/1981 Logan .................. G02B 6/3887
385/66
(Continued)

FOREIGN PATENT DOCUMENTS

EP        1530068 A2   5/2005
WO    2014066197 A1   5/2014
(Continued)

OTHER PUBLICATIONS

Righini et al., "Glass optical waveguides: a review of fabrication techniques" Optical Engineering 53 (7), 071819 (Jul. 2014) 15 pgs.*
(Continued)

*Primary Examiner* — Peter Radkowski
(74) *Attorney, Agent, or Firm* — Michael E. Carroll, Jr.

(57) ABSTRACT

Backplane optical connectors and optical connections are disclosed herein. In one embodiment, a backplane optical connector includes a ferrule element that includes a body portion having optical interface, at least two bores positioned through the body portion, at least two posts extending from the body portion, and a fiber inlet portion extending from the body portion. The fiber inlet portion includes a fiber receiving opening. The backplane optical connector further includes a magnet disposed within each bore of the at least two bores, and a bias member coupled to the at least two posts.

20 Claims, 19 Drawing Sheets

(51) Int. Cl.
*G02B 6/42* (2006.01)
*G02B 6/43* (2006.01)
*G02B 6/32* (2006.01)

(56) References Cited

U.S. PATENT DOCUMENTS

| | | | | |
|---|---|---|---|---|
| 5,333,225 | A * | 7/1994 | Jacobowitz | G02B 6/4292 333/254 |
| 5,553,180 | A * | 9/1996 | Belenkiy | G02B 6/3879 385/59 |
| 5,596,662 | A * | 1/1997 | Boscher | G02B 6/30 385/50 |
| 5,684,902 | A * | 11/1997 | Tada | G02B 6/423 385/49 |
| 5,909,526 | A | 6/1999 | Roth et al. | |
| 6,116,788 | A * | 9/2000 | Melchior | G02B 6/3821 385/59 |
| 6,206,581 | B1 | 3/2001 | Driscoll et al. | |
| 6,217,231 | B1 * | 4/2001 | Mesaki | G02B 6/421 385/14 |
| 6,334,715 | B1 * | 1/2002 | So | G02B 6/3825 385/139 |
| 6,343,171 | B1 * | 1/2002 | Yoshimura | G02B 6/12002 257/E23.01 |
| 6,402,393 | B1 * | 6/2002 | Grimes | G02B 6/3897 385/56 |
| 6,412,986 | B1 * | 7/2002 | Ngo | G02B 6/3825 385/53 |
| 6,459,843 | B1 * | 10/2002 | Igl | G02B 6/3803 385/136 |
| 6,485,192 | B1 * | 11/2002 | Plotts | G02B 6/3825 385/71 |
| 6,736,546 | B2 * | 5/2004 | Kiani | G02B 6/3885 385/59 |
| 6,960,031 | B2 * | 11/2005 | McFarland | G02B 6/4292 385/55 |
| 7,095,620 | B2 * | 8/2006 | Bozso | G02B 6/12004 361/760 |
| 7,144,259 | B2 * | 12/2006 | Ice | G02B 6/4201 385/89 |
| 7,422,376 | B2 * | 9/2008 | Chen | G02B 6/3821 385/78 |
| 7,455,463 | B2 * | 11/2008 | Togami | G02B 6/4277 385/14 |
| 7,513,698 | B2 * | 4/2009 | Andersson | G02B 6/4292 385/88 |
| 7,539,376 | B2 * | 5/2009 | Bozso | G02B 6/12004 385/14 |
| 7,548,431 | B2 * | 6/2009 | Bozso | G02B 6/12004 361/760 |
| 7,551,453 | B2 * | 6/2009 | Bozso | G02B 6/12004 361/760 |
| 7,936,953 | B2 * | 5/2011 | Johnson | G02B 6/1221 385/14 |
| 7,949,211 | B1 * | 5/2011 | Grzybowski | G02B 6/4201 385/14 |
| 8,202,012 | B2 * | 6/2012 | Stewart | G02B 6/3817 385/88 |
| 8,306,374 | B2 * | 11/2012 | Pitwon | G02B 6/3897 385/14 |
| 8,417,071 | B2 * | 4/2013 | Hopkins | G02B 6/3897 385/135 |
| 8,757,893 | B1 | 6/2014 | Isenhour et al. | |
| 9,213,152 | B2 * | 12/2015 | Shastri | G02B 6/42 |
| 2001/0041029 | A1 * | 11/2001 | Steinberg | G02B 6/30 385/50 |
| 2004/0017983 | A1 * | 1/2004 | Chen | G02B 6/3821 385/78 |
| 2004/0067027 | A1 * | 4/2004 | Plotts | G02B 6/3897 385/75 |
| 2004/0100781 | A1 * | 5/2004 | Bozso | G02B 6/12004 361/767 |
| 2004/0120658 | A1 * | 6/2004 | McFarland | G02B 6/4292 385/89 |
| 2004/0151439 | A1 * | 8/2004 | Ohtsuka | G02B 6/3834 385/78 |
| 2005/0286906 | A1 * | 12/2005 | Togami | G02B 6/4292 398/164 |
| 2006/0024005 | A1 * | 2/2006 | Ice | G02B 6/4201 385/92 |
| 2006/0291175 | A1 * | 12/2006 | Bozso | G02B 6/12004 361/767 |
| 2007/0003195 | A1 * | 1/2007 | Ice | G02B 6/4201 385/92 |
| 2007/0092185 | A1 * | 4/2007 | Sasaki | G02B 6/3885 385/89 |
| 2008/0107374 | A1 * | 5/2008 | Bozso | G02B 6/12004 385/14 |
| 2008/0107421 | A1 * | 5/2008 | Bozso | G02B 6/12004 398/135 |
| 2008/0112674 | A1 * | 5/2008 | Andersson | G02B 6/4292 385/92 |
| 2008/0124025 | A1 * | 5/2008 | Bozso | G02B 6/12004 385/31 |
| 2009/0162004 | A1 * | 6/2009 | Johnson | G02B 6/1221 385/14 |
| 2010/0027941 | A1 * | 2/2010 | Stewart | G02B 6/3817 385/57 |
| 2011/0222821 | A1 * | 9/2011 | Pitwon | G02B 6/3897 385/92 |
| 2011/0222823 | A1 * | 9/2011 | Pitwon | G02B 6/42 385/93 |
| 2011/0286691 | A1 * | 11/2011 | Hopkins | G02B 6/3897 385/14 |
| 2012/0237168 | A1 * | 9/2012 | Aoki | G02B 6/3821 385/71 |
| 2013/0077919 | A1 | 3/2013 | Zong et al. | |
| 2013/0156377 | A1 * | 6/2013 | DeMeritt | G02B 6/3885 385/59 |
| 2013/0182996 | A1 * | 7/2013 | Shastri | G02B 6/42 385/14 |
| 2014/0112623 | A1 * | 4/2014 | Bradley | G02B 6/4293 385/79 |
| 2014/0219612 | A1 * | 8/2014 | Butler | G02B 6/4267 385/78 |
| 2014/0259477 | A1 * | 9/2014 | Huang | B65H 57/26 15/97.1 |
| 2014/0328562 | A1 * | 11/2014 | Pitwon | G02B 6/4293 385/89 |
| 2015/0118870 | A1 * | 4/2015 | Swaminathan | H01R 12/716 439/65 |

FOREIGN PATENT DOCUMENTS

WO 2014093737 A1 6/2014
WO 2014186436 A1 11/2014

OTHER PUBLICATIONS

Schröder et al., "Strategies for glass based photonic system integration," Proceedings of the 5th Electronics System-integration Technology Conference (ESTC), Helsinki, 2014, pp. 1-7.*
Pitwon et al. Pluggable Electro-Optical Circuit Board Interconnect Based on Embedded Graded-Index Planar Glass Waveguides, Journal of Lightwave Technology, vol. 33, No. 4, Feb. 15, 2015.*
Pitwon, R., Hopkins, K. and Milward D., "An Optical Backplane Connection System With Pluggable Active Board Interfaces," Oct. 2007, 12 pages, http://www.xyratex.com/sites/default/files/Xyratex_white_paper_Optical_Backplane_Connection_System_2-0.pdf.
G.C. Righini and A. Chiappini, "Glass optical waveguides: a review of fabrication techniques" Optical Engineering 53 (7), 071819 (Jul. 2014) 15 pgs.
EP16199109.6 Search Report dated Apr. 12, 2017, European Patent Office.

(56) References Cited

OTHER PUBLICATIONS

EP16199109.6 Supplemental Search Report and Office Action dated Aug. 28, 2017, European Patent Office, 17 Pgs.

\* cited by examiner

BACKPLANE OPTICAL CONNECTORS AND OPTICAL CONNECTIONS INCORPORATING THE SAME

BACKGROUND

Field

The present disclosure generally relates to optical connectors and, more particularly, to optical connectors that optically couple components of a circuit board to a components of a backplane.

Technical Background

Benefits of devices having optical waveguides include extremely wide bandwidth and low noise operation. Because of these advantages, devices with optical waveguides are increasingly being used for a variety of applications, including but not limited to broadband voice, video, and data transmission. For example, fiber optic networks employing optical fiber are being developed and used to deliver voice, video, and data transmissions to subscribers over both private and public networks.

For example, optical fiber may be employed in data distribution centers or central offices for telecommunications and storage systems applications. These applications include, but are not limited to, server farms, such as for web page accesses, and remote storage equipment, such as for backup storage purposes, as examples. However, today's networks still use transceivers mounted at the edge of printed circuit boards for converting optical signals to electrical signals and vice-versa such as the electrically-based server blades in communications network. As bandwidth demands continue to increase there will be a need for reducing the length of the electrical traces carrying the high-speed signals by positioning the transceivers "on-board" so that the transceivers performing the optical/electrical conversion are closer to the processor integrated circuit. As such, there will be a need to provide optical traces (i.e., optical waveguides) in circuit boards for transporting the optical signals between the edge of the board and the transceivers. To provide for efficient management and organization of equipment such as server blades, they are organized and mounted in equipment racks. By way of explanation, equipment racks comprise of rails extending in a vertical direction and spaced a distance apart to support a plurality of modular housings disposed between the rails in vertical space. The modular housings are configured to support information processing devices, such as computer servers, data storage devices, and/or other circuits in the form of server blades, sometimes referred to as cards.

Conventional server blades are formed as conventional printed circuit board (PCB) server blades or cards. Conventional server blades or cards contain electrical traces for interconnecting electrical components mounted on the server blade or card. As bandwidth demands increase there is an unresolved need to provide server blades or cards that can transmit high-speed optical signals. However, optical signals require an optical connection between the optical components associated with the printed circuit board and the optical components associated with the backplane. Such optical connections may be costly due to the precise alignment requirements needed between the mated optical connectors. In some cases, costly internal optical jumpers are required to facilitate board-side optical connections. These internal optical jumpers not only add cost, but also introduce optical loss.

Accordingly, alternative optical connectors that eliminate optical jumpers in printed circuit board to backplane optical connections are desired.

SUMMARY

Embodiments are directed to optical connections that include a backplane optical connector and a circuit board optical connector positioned on the edge of a circuit board to optically couple the circuit board to the backplane without the use of internal optical jumpers. Suck optical connections may be employed in an equipment rack, such as an equipment rack utilized in a data distribution center and telecommunications applications, for example.

In embodiments described herein, the circuit board optical connector is rigidly coupled to the edge of the circuit board, while one or more components of the backplane optical connector floats with respect to the backplane. This allows the backplane optical connector to be active, and to move to the circuit board optical connector of the incoming circuit board. Magnets are utilized to both provide the attractive force for initiating the float (i.e., movement) in the backplane optical connector as well as to maintain the mating force between the circuit board optical connector and the backplane optical connector.

In this regard, in one embodiment, a backplane optical connector includes a ferrule element that includes a body portion having an optical interface, at least two bores positioned through the body portion, at least two posts extending from the body portion, and a fiber inlet portion extending from the body portion. The fiber inlet portion includes a fiber receiving opening. The backplane optical connector further includes a magnet disposed within each bore of the at least two bores, and a bias member coupled to the at least two posts.

In another embodiment, a backplane optical connector includes an outer housing including an outer housing opening positioned within the outer housing, an inner housing comprising a mating surface and an inner housing opening positioned within the inner housing. The inner housing is disposed within the outer housing opening. The backplane optical connector further includes at least two magnets disposed within the inner housing, a ferrule element, and a cap portion. The ferrule element includes an optical interface and is disposed within the inner housing opening. The ferrule element is movable with respect to the inner housing. The cap portion includes a cap opening. The cap portion is coupled to the outer housing, and the inner housing is disposed within the cap opening.

In yet another embodiment, an optical connection includes a circuit board having an edge, a circuit board optical connector rigidly coupled to the edge of the circuit board, a backplane having a surface, and a backplane optical connector. The circuit board optical connector includes a receptacle body having a receptacle optical interface and at least two receptacle magnets. The backplane optical connector is positioned at the surface of the backplane. The backplane optical connector includes a ferrule element having an optical interface, wherein the ferrule element is movable with respect to the backplane. The backplane optical connector further includes at least two backplane magnets.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate embodiments, and together with the description serve to explain principles and operation of the various embodiments.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Embodiments are directed to optical connectors and, more particularly, to backplane optical connectors and optical connections for edge-wise optical coupling of circuit boards to backplane structures. As an example and not a limitation, the backplane optical connectors and optical connections described herein may be employed in rack-based equipment, such as racks employed in data distribution centers and telecommunications applications. A floatable optical connector is employed on the backplane side, while a rigid optical connector is provided on the edge of the circuit board. Magnets are utilized to both provide the attractive force for initiating the float (i.e., movement) in the backplane optical connector as well as to maintain the mating force between the circuit board optical connector and the backplane optical connector. When the edge of the circuit board is brought into close proximity with the backplane, the backplane optical connector advances toward the circuit board connector due to magnetic attraction. The floating backplane optical connector then moves into a mated state with the circuit board connector.

Figure 1:
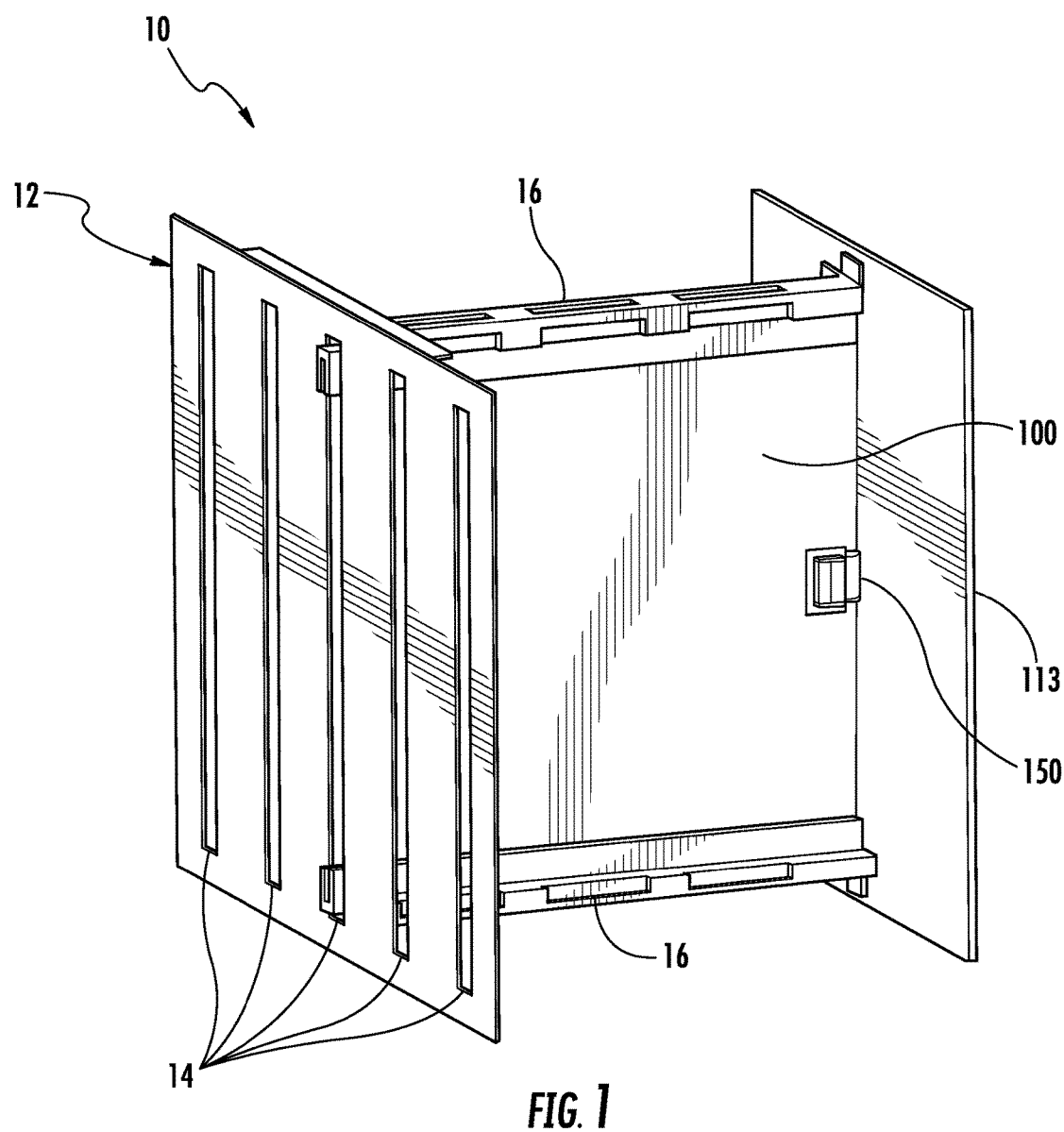
FIG. 1 schematically depicts a perspective view of an example equipment rack comprising a circuit board and a backplane according to one or more embodiments described and illustrated herein.

Referring now to FIG. 1, an example equipment rack 10 for inclusion in a data distribution center or telecommunications application, for example, is schematically depicted. The data center may be employed for telecommunications and/or data storage functionality, for example. It should be understood that, although the optical connections and connectors are described and illustrated herein in the context of rack-based data centers, embodiments are not limited thereto.

The example equipment rack 10 generally comprises a faceplate 12 having a plurality of slots 14, rails 16, a backplane 150, and at least one optical circuit board 100 ("circuit board"). As shown in FIG. 1, a single circuit board 100 is positioned through one of the slots 13 within the faceplate 12 and along two rails 16. The circuit board 100 is optically coupled to the backplane 150 by an optical connection 113. As used herein, the term "optically coupled" means a connection between two components such that optical signals are passed between the two components.

Figure 2A:
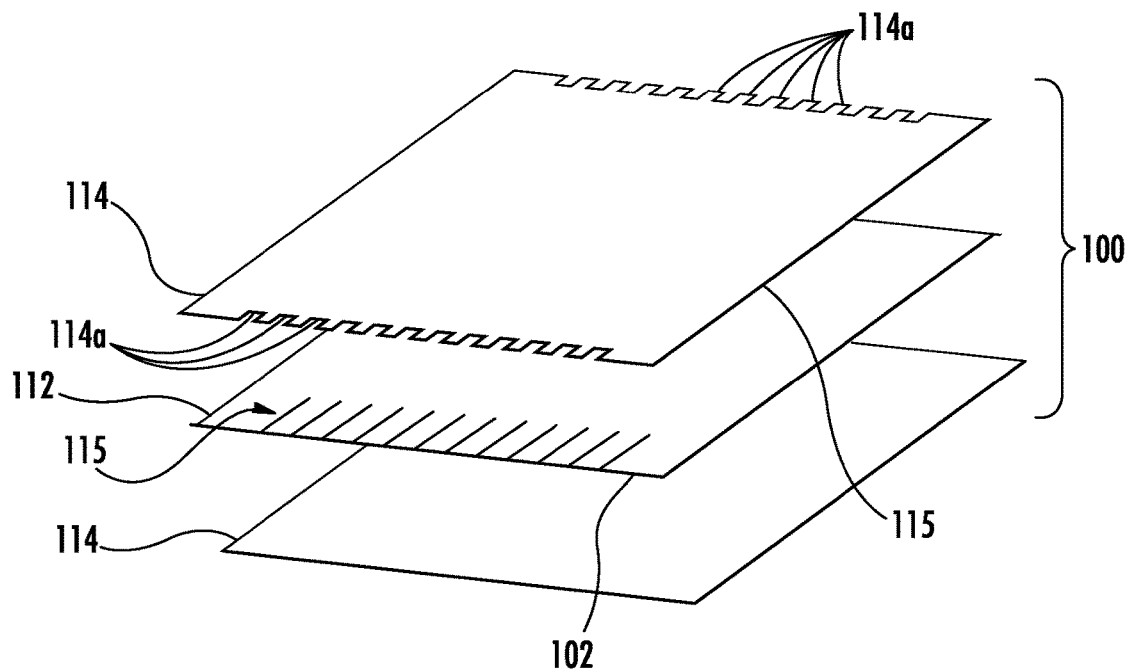
FIG. 2A is an exploded perspective view of an example circuit board comprising a glass substrate and two non-glass substrates according to one or more embodiments described and illustrated herein.
Figure 2B:
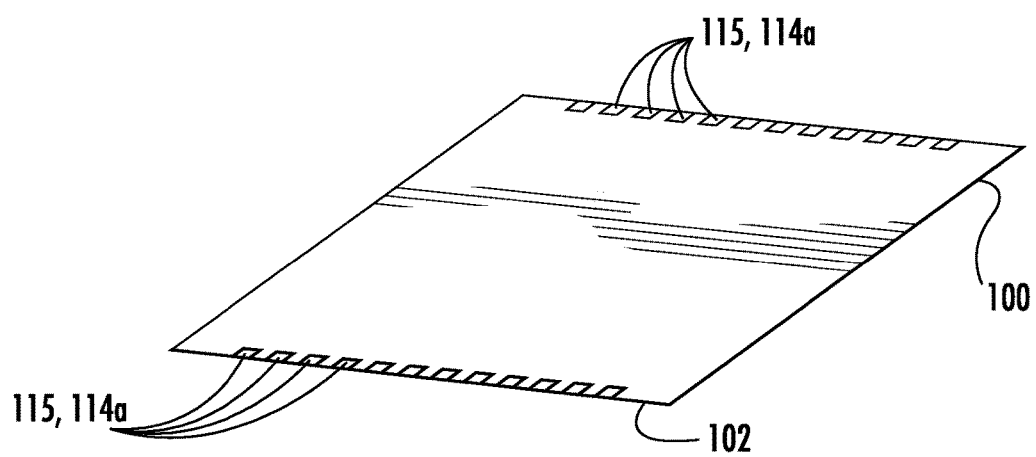
FIG. 2B schematically depicts an assembled perspective view of the example circuit board depicted in FIG. 2A.

FIG. 2A is an exploded view and FIG. 2B is an assembled view of an explanatory composite circuit board 100 comprising a glass substrate 112 and at least a first non-glass substrate 114. In the explanatory embodiment depicted in FIGS. 2A and 2B, a first non-glass substrate 114 (i.e., "upper substrate") is shown with a one-sided major planar area A1 that is smaller than an one-sided major planar area A2 for the glass substrate 112 (i.e., "middle substrate") due to the use of one or more cut-outs 114a in the first non-glass substrate 114. As depicted, the first non-glass substrate 114 comprises a plurality of cut-outs 114a disposed on opposite ends of the circuit board 100 that expose portions of the glass substrate 112 of the circuit board 100. The at least one cut-out 114a in the non-glass substrate 114 may be used for providing a ledge or attachment point for an optical connector. It should be understood that, circuit board assemblies disclosed herein may have multiple substrates that are attached or laminated together as desired such as a second non-glass substrate 114 (i.e., a "lower substrate" depicted in FIG. 2A) attached to the glass substrate 112.

The circuit board 100 has at least one optical trace 115 (i.e., an optical waveguide) for optical communication comprising one or more optical interfaces the circuit board 100. Optical interface(s) are arranged for making an optical connection to the circuit board 100 at one or more locations of the circuit board 100. Optical interfaces may have one or more optical trace 115 and be arranged in groups on circuit board 100. For instance, the optical trace 115 may be arranged in groups of two, four, eight, ten or twelve optical traces on one or more end portions of the circuit board. Likewise, other portions of the circuit board may also include one or more optical interfaces as desired such as at a mid-span location. As shown, the at least one optical trace 115 may be arranged on a portion of the glass substrate 112.

For instance, the illustrated circuit board comprises an edge 102 with an end surface, and the optical traces 115 may have an end portion (not numbered) that is accessible at the edge 102 of circuit board 100. The end portions of the optical traces 115 may be used for optical communication with the circuit board 100. By way of explanation, further assemblies of optical circuit boards may further comprise one or more lens bodies or other components attached to the end portions of the optical traces 115 so that optical channel (s) of the respective lens body are in optical communication with the optical traces 115 of the circuit board.

Any suitable method of making the optical traces 115 on or in a glass substrate 112 and may be used with the concepts disclosed herein. For instance, the glass substrates 112 may have optical traces 115 written using physical or chemical thin-film deposition or may use a process that modifies the refractive index (RI) of the glass substrate 112, such as ion exchange or laser writing to create the optical trace 115. Other methods of forming the optical trace 115 are also possible. More detailed examples of such methods are given in the paper from G. C. Righini and A. Chiappini, titled "Glass optical waveguides: a review of fabrication techniques" Optical Engineering 53(7), 071819 (July 2014), the contents of which are incorporated herein by reference.

As shown in FIG. 2A, the upper non-glass substrate 114 has a plurality of cut-outs 114a arranged in arrays at opposing ends of the circuit board 100. Cut-outs 114a may also be located at mid-span portions of the non-glass substrate 114 for creating "fly-over" locations in the circuit board such as depicted in FIG. 1. As depicted, the circuit board 100 may optionally have more than one non-glass substrate 114 such as a sandwich construction of the glass substrate 112 by non-glass substrates 114. One manner of attaching substrates is by lamination, but any suitable arrangement or constructions are possible for the substrates of the circuit board 100. For instance, the circuit boards could also use multiple glass substrates 112 for making distinct optical layers and optical traces/optical interfaces on the different optical layers. Additionally, the circuit boards may also have electrical circuits in one or more the substrates for making hybrid optical/electrical circuit boards. For example, an electrical circuit may be disposed on the non-glass substrate 114 by using a conventional electrical circuit boards attached to the glass substrate 112. Electrical connections on the non-glass substrates 114 could be wiping or sliding electrical connections at a surface or edge of the circuit board 100, electrical pads or solder locations, pins, etc. as known in the art.

The circuit board 100 may include one or more active optical components that are actively coupled to one or more optical traces 115. The active optical components may include one or optical transmitting devices operable to transmit one or more optical signals, and one or more optical receiving devices operable to receive one or more optical signals. In such a manner, the active optical components may act as an opto-electric and/or electro-optical transceiver device cable of converting electrical signals into optical signals and vice versa. Example optical transmitting devices include laser diodes, such as vertical-cavity surface-emitting lasers ("VCSELs"), for example. It should be understood that other laser devices, and other light emitting device, may be utilized to emit optical signals. The optical receiving device may be a photodiode, for example.

The backplane 150 of the example equipment rack 10 depicted in FIG. 1 is provided as a surface to receive optical and/or electrical connectors of circuit boards 100 inserted into the equipment rack 10. As described in more detail below, optical fibers may be provided through the backplane 150 to provide optical signals received at the optical connection 113 to other optical components either internal or external to the equipment rack 10. In this manner, the backplane 150 provides a surface in which to provide an optical connection between the circuit board 100 and optical fibers within the equipment rack.

Figure 3:
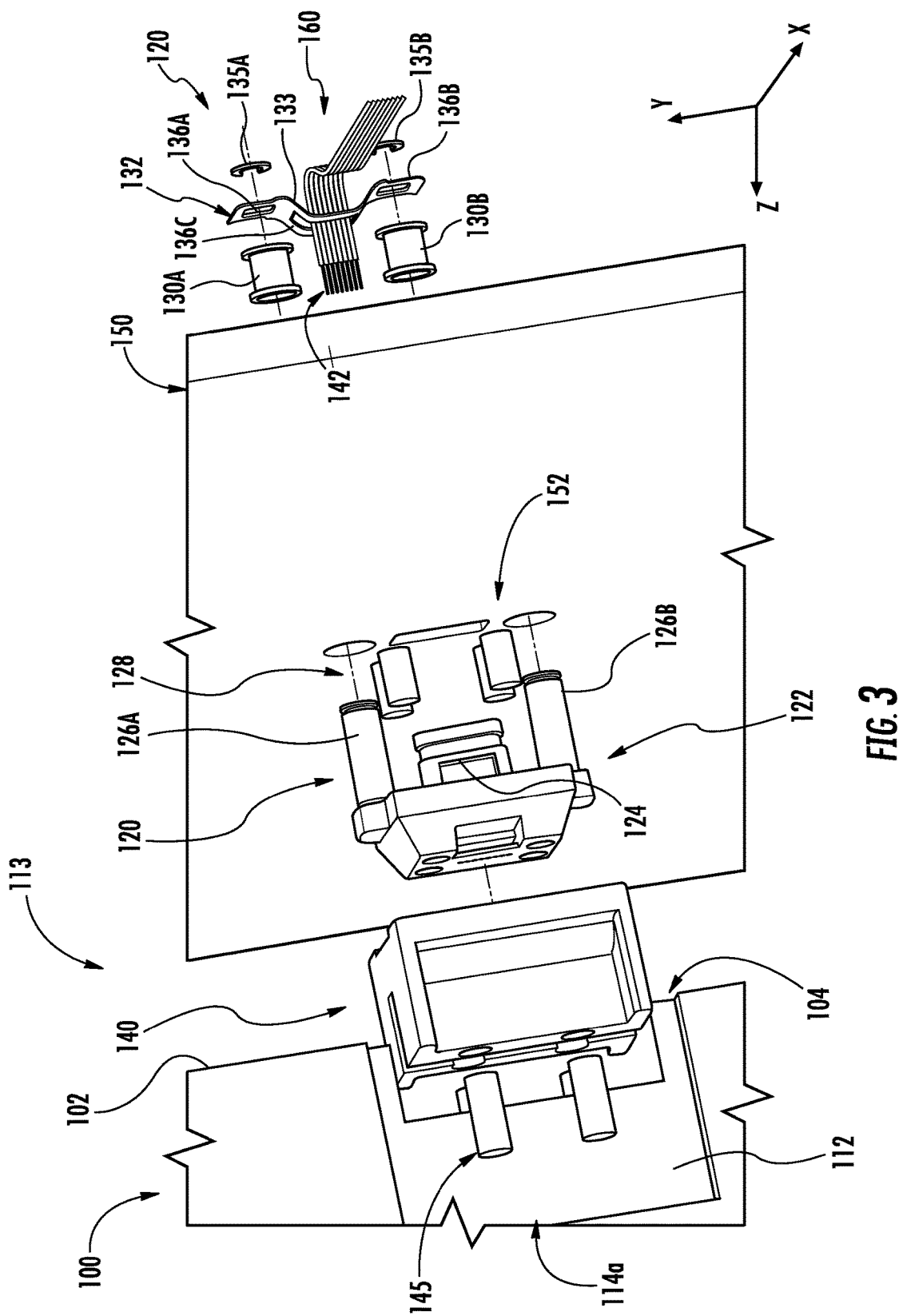
FIG. 3 schematically depicts an exploded perspective view of an example circuit board, an example circuit board optical connector, an example backplane, and an example backplane optical connector according to one or more embodiments described and illustrated herein.

Referring now to FIG. 3, an example optical connection 113 for optically coupling the circuit board 100 to the backplane 150 according to one or more embodiments is schematically illustrated in an exploded perspective view. The illustrated circuit board 100 has a cut-out 114a that exposes an inner glass substrate 112 proximate an edge 102 (see FIGS. 2A and 2B). Although not illustrated in FIG. 3, the inner glass substrate 112 includes at least one optical trace 115 that is optically coupled to one or more active optical components (not shown) on the circuit board 100. In the illustrated embodiment, the exposed inner glass substrate 112 includes a notch 104 shaped to receive a circuit board optical connector 140. Accordingly, the circuit board optical connector 140 is rigidly coupled to the edge of the circuit board 100 at the inner glass substrate 112. As used herein, the term "coupled" means at least two components are mechanically connected by any suitable means. In some instances, two components described herein may be translatably coupled or moveably coupled, in which case one component is translatable or movable with respect to a second component. "Rigidly coupled" means that the two coupled components are not moveable with respect to one another.

Figure 4A:
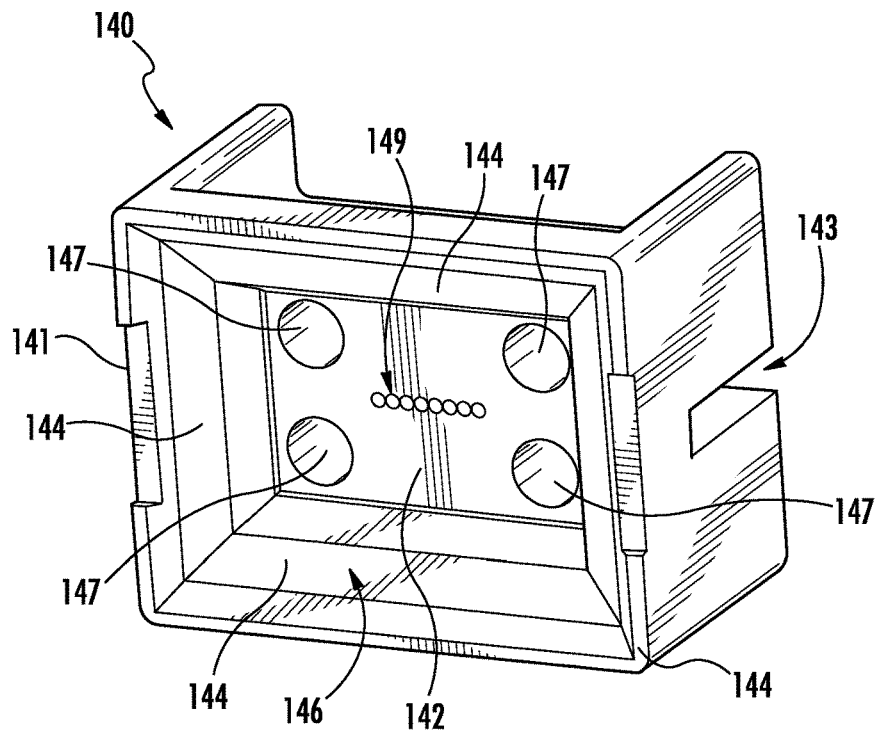
FIG. 4A schematically depicts a front perspective view of the example circuit board optical connector depicted in FIG. 3 according to one or more embodiments described and illustrated herein.
Figure 4B:
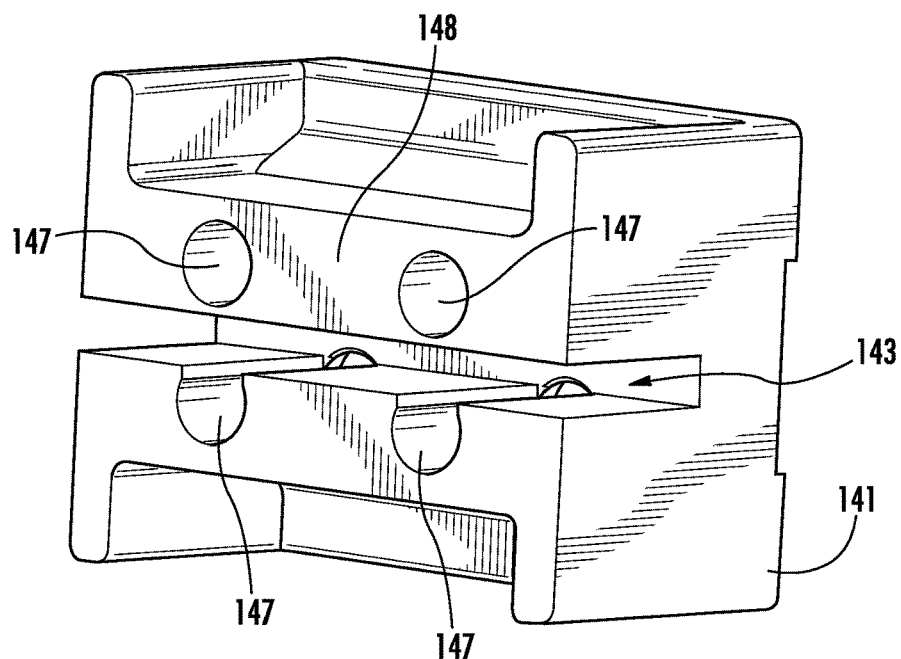
FIG. 4B schematically depicts a rear perspective view of the example circuit board optical connector depicted in FIGS. 3 and 4A according to one or more embodiments described and illustrated herein.

FIG. 4A is a front perspective view of the example circuit board optical connector 140 depicted in FIG. 3, while FIG. 4B is a rear perspective view of the example circuit board optical connector 140 depicted in FIGS. 3 and 4A. Referring to FIG. 4A, the example circuit board optical connector 140 has a receptacle body 141 with four non-parallel walls 144 defining a trapezoidal recess 146 in which to receive a backplane optical connector 120 as shown in FIG. 3. The trapezoidal recess 146 acts to guide the complementarily shaped backplane optical connector 120 into a mated relationship with the circuit board optical connector 140 such that their respective lens arrays are optically coupled, as described in more detail below. It should be understood that, in other embodiments, the receptacle body 141 does not have a trapezoidal recess but rather takes on a different shape or configuration.

The four non-parallel walls 144 of the example receptacle body 141 extend from a receptacle optical interface 142 having an array of lenses 149. The receptacle optical interface 142 is a surface of the receptacle body 141 at which the array of lenses 149 are exposed and positioned to mate with a corresponding array of lenses of the backplane optical connector 120. It is noted that the receptacle body 141 may be fabricated from a material that is optically transmissive to optical signals passing through the array of lenses 149. As used herein, the term "optically transmissive" means that an optical signal is capable of passing through the material without substantial optical loss such that the optical communication by way of the optical signals is passed through the material. In some embodiments, the receptacle body 141 is molded from an optically transmissive polymer. As a non-limiting example, the receptacle body 141 may be molded from ULTEM™, an amorphous thermoplastic polyetherimide fabricated by SABIC of Pittfield, Mass. Accordingly, the array of lenses 149, as well as the other features of the receptacle body 141, may be fabricated during the molding process.

Referring to both FIGS. 4A and 4B, the example receptacle body further includes four bores 147 configured to receive magnets 145 as shown in the exploded view of FIG. 3. As described in more detail below, the circuit board optical connector 140 mates with the backplane optical connector 120 by magnetic attraction between the magnets 145 within the receptacle body 141 and the magnets 128 of the backplane optical connector 120. It should be understood that embodiments are not limited to four bores 147 and four magnets 145 as shown in FIGS. 3, 4A and 4B as any number of these components may be utilized. It is noted that an increased number of magnets 145 may provide for alignment between the array of lenses 149 of the receptacle body with the array of lenses 129 of the backplane optical connector 120 in some embodiments. For example, a coded magnetic array of individual magnets (not shown) may be provided in or on the receptacle body to magnetically mate with a corresponding coded magnetic array (not shown) provided in the ferrule element 122 of the backplane optical connector 120. The individual magnets of the coded magnetic array within the receptacle body 141 may have a magnetic polarity according to a coded pattern that magnetically mates with individual magnets of the coded magnetic array within the ferrule element 122.

Additionally, it should also be understood that embodiments are not limited to cylindrical bores 147 and magnets 145, as these components may take on other geometric shapes. In some embodiments, the bores 147 are blind bores and not through-holes as shown in FIGS. 4A and 4B such that the bores 147 do not extend through the receptacle optical interface 142.

Figure 6:
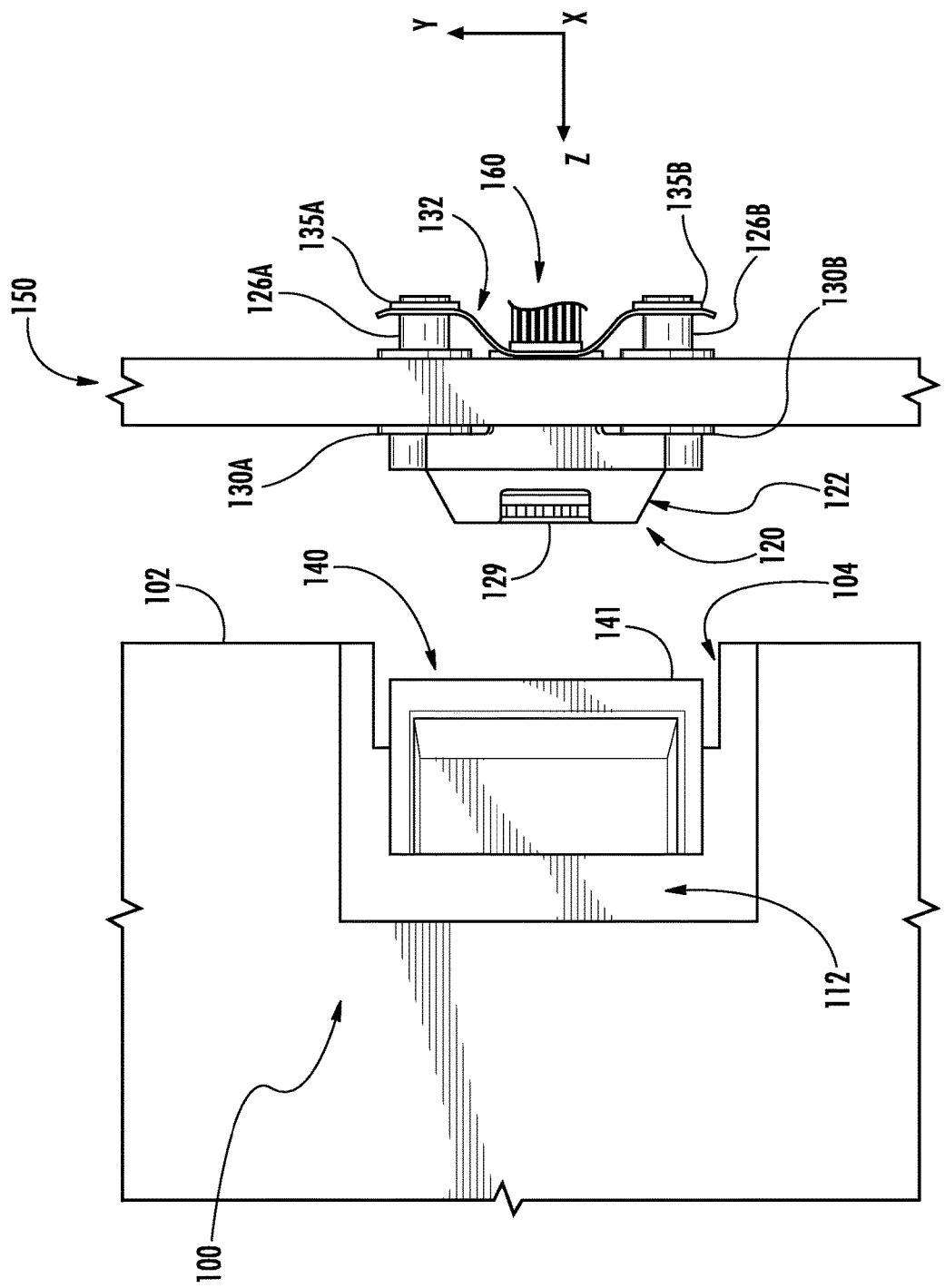
FIG. 6 schematically depicts a side view of the example circuit board and the example backplane depicted in FIG. 3 in an unmated state.

The illustrated circuit board optical connector 140 includes a rear surface 148. A notch 143 is positioned through the rear surface 148. The notch 143 is shaped such that it may receive the edge 102 of the inner glass substrate 112 of the circuit board 100 (see FIG. 3). Referring briefly to FIG. 6, a circuit board optical connector 140 coupled to the inner glass substrate 112 is schematically depicted. When the inner glass substrate 112 is positioned within the notch 143, the optical traces 115 (not shown) within or on the inner glass substrate 112 at the edge 102 (see FIGS. 2A and 2B) are optically coupled to the array of lenses 149 of the circuit board optical connector 140. The circuit board optical connector 140 may be rigidly coupled to the inner glass substrate 112 by any appropriate means, such as by use of an adhesive, for example. The adhesive may be chosen to be transmissive to optical signals and to have a refractive index approximately equal to the geometric mean of the index of the optical traces and the index of the circuit board optical connector, in which case the adhesive also provides index-matching to reduce optical reflection.

Referring once again to FIG. 3, an example backplane optical connector 120 is schematically depicted in an exploded view. The illustrated backplane optical connector 120 generally comprises a ferrule element 122, magnets 128, a bias member 132, and a fiber optic cable comprising a plurality of optical fibers 160.

Figure 5A:
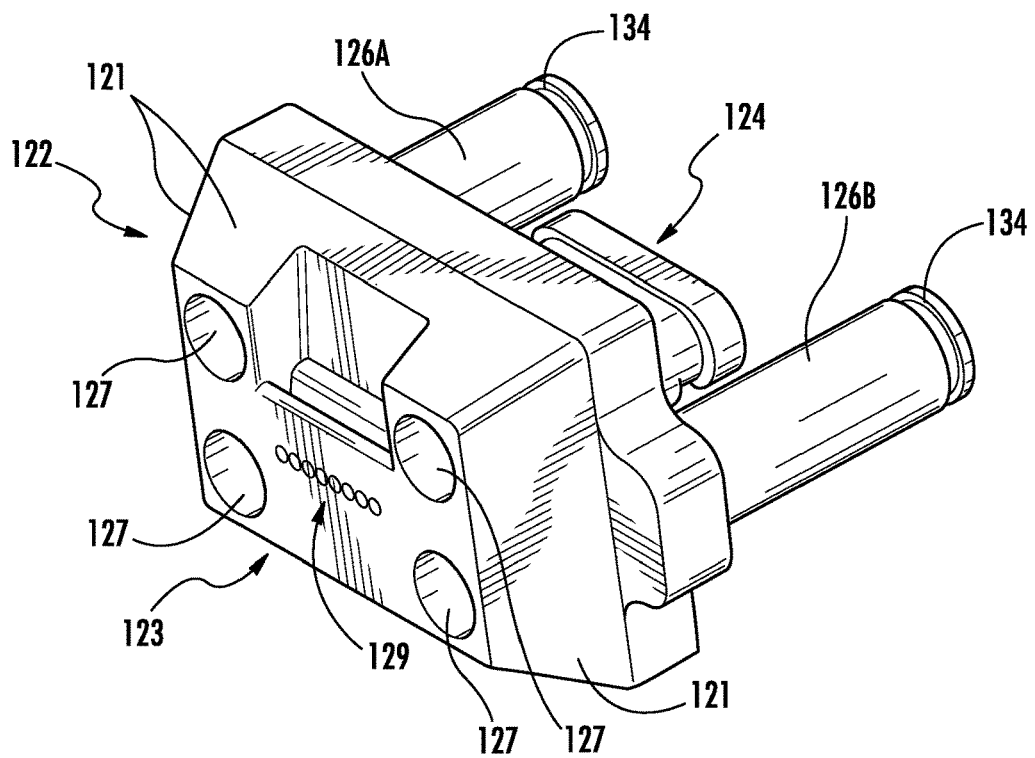
FIG. 5A schematically depicts a front perspective view of an example ferrule element of the backplane optical connector depicted in FIG. 3 according to one or more embodiments described and illustrated herein.
Figure 5B:
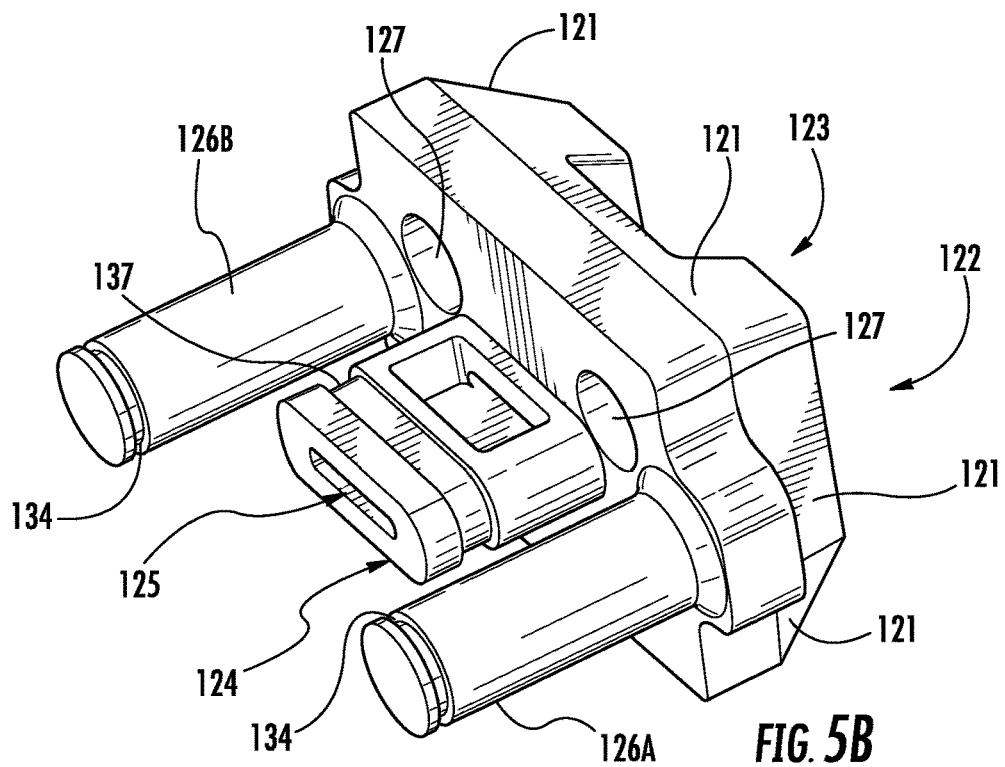
FIG. 5B schematically depicts a rear perspective view of the example ferrule element depicted in FIGS. 3 and 5A according to one or more embodiments described and illustrated herein.

FIG. 5A schematically depicts a front perspective view of the example ferrule element 122 shown in FIG. 3, and FIG. 5B schematically depicts a rear perspective view of the example ferrule element 122. The ferrule element 122 may be fabricated from an optically transmissive material such that optical signals may be able to pass therethrough. For example, the ferrule element 122 may be molded from ULTEM™ as described above with respect to the receptacle body 141.

The example ferrule element 122 has four non-parallel walls 121 that define a trapezoidal mating interface that is complementary to the trapezoidal recess 146 of the receptacle body 141. The trapezoidal shape of both the ferrule element 122 and the receptacle body 141 may assist in aligning the ferrule element 122 and the receptacle body with respect to one another when the backplane optical connector 120 is mated to the circuit board optical connector 140. It should be understood that shapes other than a trapezoid may be utilized.

The non-parallel walls 121 terminate at an optical interface 123 comprising an array of lenses 129. The array of lenses 129 may be configured as molded features of the ferrule element 122, for example. As described in more detail below, the array of lenses 129 of the ferrule element 122 is aligned with the array of lenses 149 of the receptacle body 141 when the backplane optical connector 120 is mated to the circuit board optical connector 140.

The ferrule element 122 further includes four bores 127 in which four magnets 128 are disposed. As stated above, more or fewer than four bores 127 and four magnets 128 may be provided. The number of magnets 128 associated with the ferrule element 122 should be the same as the number of magnets 145 associated with the receptacle body 141. The placement of the bores 127 within the ferrule element 122 should be such that they align with the bores 147 of the receptacle body 141 to align the respective arrays of lenses 149, 129 during mating between the backplane optical connector 120 and the circuit board optical connector 140. The bores 127 may be configured as blind-bores that do not fully extend through the optical interface 123 in some embodiments. As stated above, a coded magnetic array may be provided the magnets 128, wherein the magnets 128 have a magnetic polarity operable to mate with the magnets 148 defining a coded magnetic array within the receptacle body 141. It is noted that, although magnets 128, 148 are illustrated as being disposed in both the ferrule element 122 and the receptacle body 141, embodiments are not limited thereto. For example, magnets may be disposed in the ferrule element 122 or the receptacle body 141, and a magnetic material may be disposed in ferrule 122 or the receptacle body 141 that does not include magnets.

The example ferrule element 122 further comprises a first post 126A, a second post 126B, and a fiber inlet portion 124 extending from a surface opposite from the optical interface 123. The fiber inlet portion 124 receives the plurality of optical fibers 160 through a fiber inlet opening 125. The plurality of optical fibers 160 may be disposed within fiber bores (not shown) within the fiber inlet opening 125 and optically coupled to the array of lenses 129. The plurality of optical fibers may be secured within the fiber inlet opening 125 by an adhesive, for example. The adhesive may be chosen to be transmissive to optical signals and to have a refractive index approximately equal to the geometric mean of the index of the plurality of optical fibers 160 and the index of the ferrule element 122.

Referring specifically to FIG. 3, the example backplane 150 includes openings 152 operable to receive the first post 126A, the second post 126B and the fiber inlet portion 124. The openings 152 allow for the ability for the ferrule element 122 to translate back and forth along the z-axis. The openings 152 may be oversized with respect to the outer dimensions of the first post 126A, the second 126B and the fiber inlet portion 124 so that the ferrule element 122 floats within the openings 152 of the backplane 150 and may slightly move along the x-axis and the y-axis. As shown in FIG. 3, the backplane optical connector 120 may further include a first bushing 130A and a second bushing 130B that is positioned on the first and second and second posts 126A, 126B, respectively. The bushings 130A, 130B are disposed within the openings 152.

It should be understood that more than two posts 126 may be provided in other embodiments. In other embodiments, no fiber inlet portion 124 is provided. Rather, the optical fibers 160 are positioned within a bulk of the ferrule element 122.

The illustrated bias member 132 is configured as a strip of a compliant material having first and second ends with a curved or bent portion 133 between the first and second ends. The compliant material is a material having a modulus of elasticity such that it is capable of being deformed in response to a force and returned to an original shape upon removal of the force. A non-limiting example of a compliant material is steel. As shown in FIG. 3, the example bias member includes a first opening 136A at the first end, a second opening 136B at the second end, and a third opening 136C at the bent portion 133. Referring briefly to FIG. 5B, each of the first post 126A and the second post 126B has a groove 134 that is disposed within the first opening 136A and the second opening 136B of the bias member 132, respectively. In the illustrated embodiment, the fiber inlet portion 124 also includes a groove 137 around which the third opening 136C of the bias member 132 is disposed. The grooves 134 and 137 maintain the bias member 132 on the ferrule element 122 at the first and second posts 126A, 126B and the fiber inlet portion 124.

Referring now to FIG. 6, the example backplane optical connector 120 shown in FIGS. 3, 5A and 5B is schematically depicted as coupled to a portion of a backplane 150, wherein the backplane optical connector 120 is in an un-mated state with respect to a circuit board connector 140 coupled to a portion of a circuit board 100. The first and second bushings 130A, 130B are disposed in the openings 152 (not visible in FIG. 6) of the backplane 150. The first and second posts 126A, 126B are disposed through the first and second bushings 130A, 130B, respectively. Additionally, the fiber inlet portion 124 is also disposed through one of the openings 152 of the backplane 150. The bias member 132 is disposed on the first and second posts 126A, 126B within the grooves 134 as described above. In the illustrated embodiment, first and second clips 135A, 135B are disposed within the grooves 134 to assist in maintaining the bias member 132 to the first and second posts 126A, 126B. The bias member 132 applies a force on the ferrule element 122 in the negative z-axis direction during the unmated state to maintain the ferrule element 122 in a retracted state with respect to the backplane 150.

Figure 7:
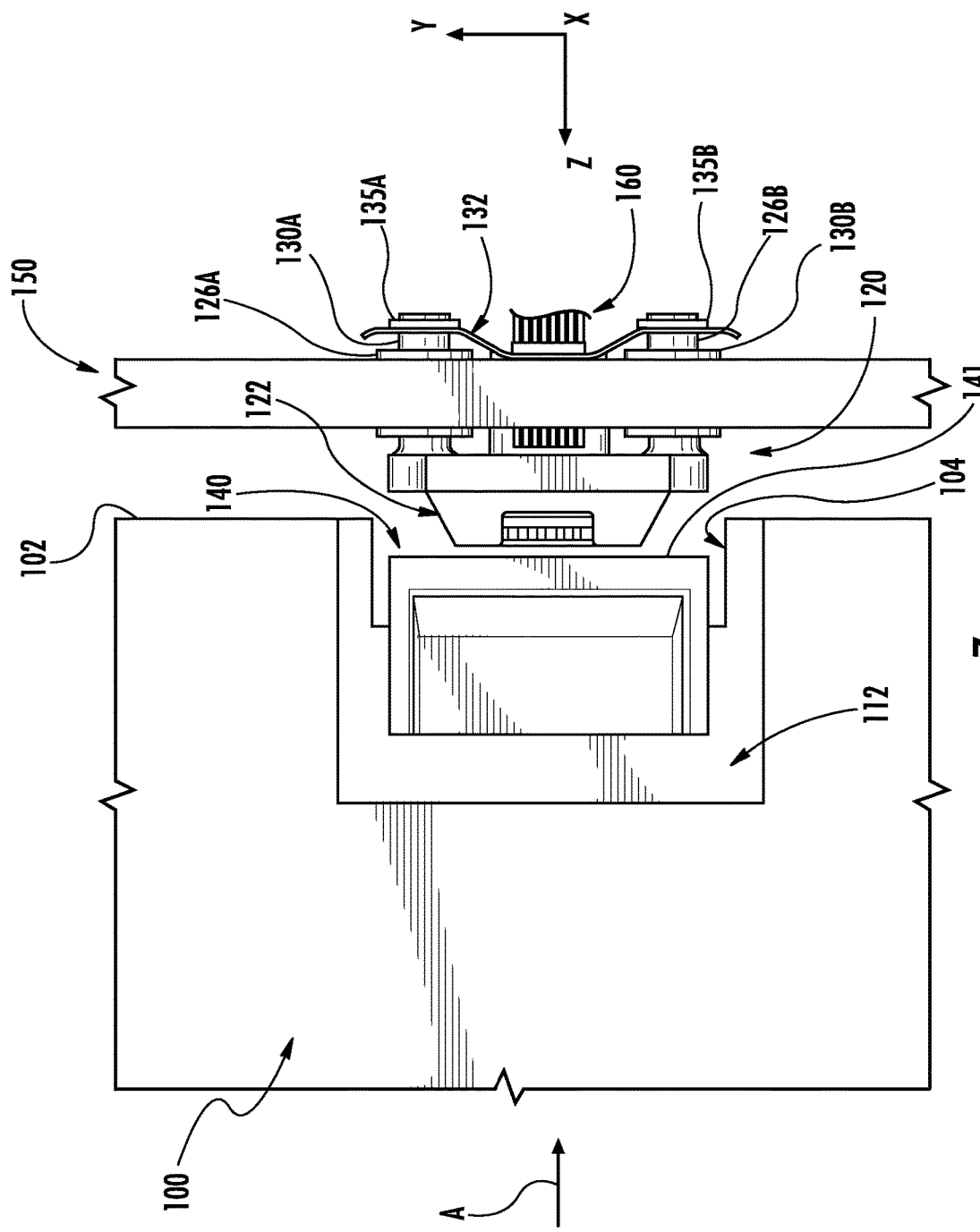
FIG. 7 schematically depicts a side view of the example circuit board and the example backplane depicted in FIG. 3 with the circuit board moved closer to the backplane.

FIG. 7 schematically depicts the circuit board 100 being advanced toward the backplane 150 in the negative z-axis axis as indicated by arrow A. Magnetic attraction between the magnets 145 (not shown in FIG. 7, see FIG. 3) in the receptacle body 141 and the magnets 128 (not shown in FIG. 7, see FIG. 3) in the ferrule element 122 advance the ferrule element 122 toward the circuit board optical connector 140 in a positive direction along the z-axis. As shown in FIG. 7, the ferrule element 122 is in an unretracted, advanced state such that it translates through the openings 152 in the backplane 150, and the bias member 132 is in a compressed state.

Figure 8:
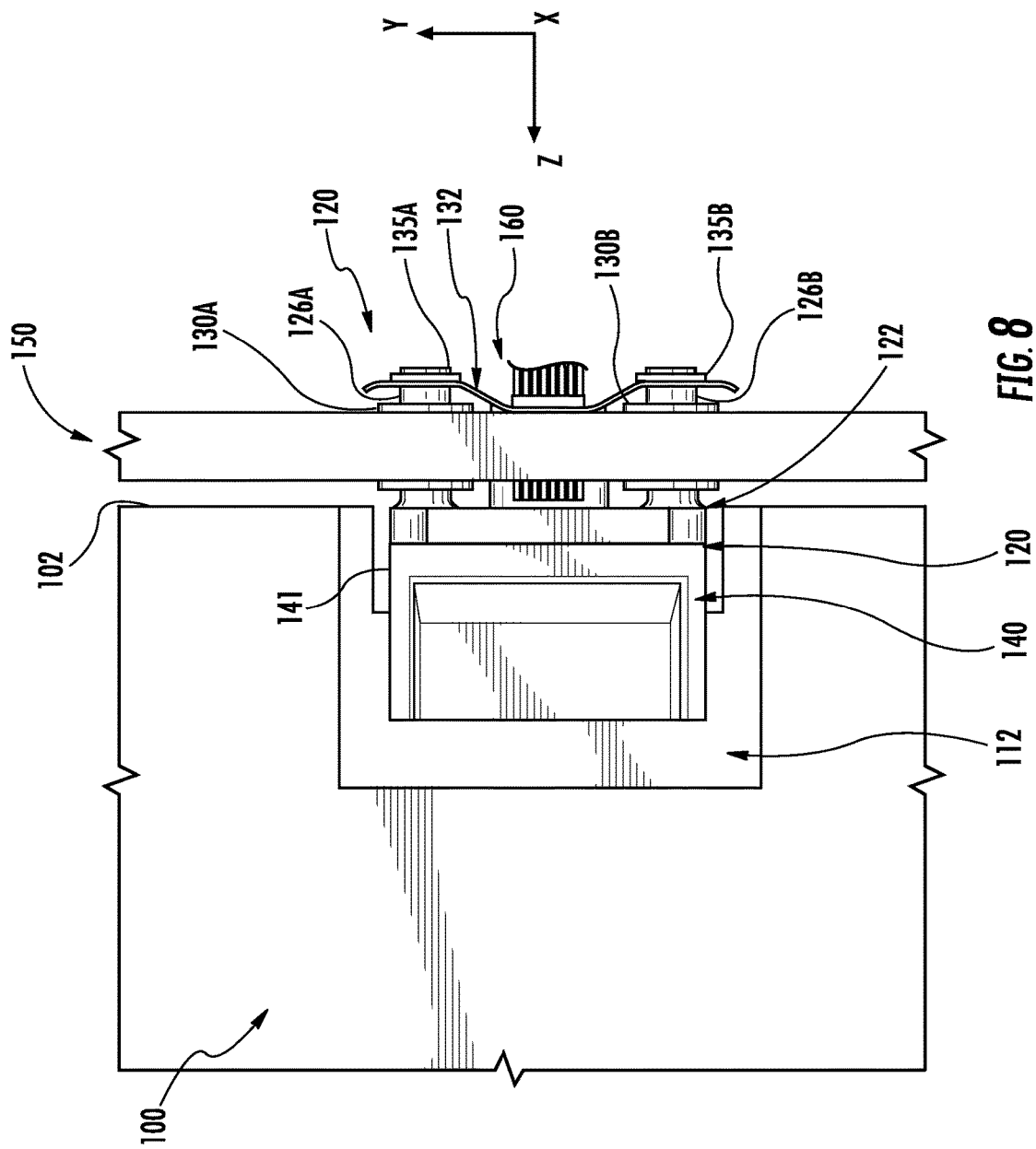
FIG. 8 schematically depicts a side view of the example circuit board and the example backplane depicted in FIG. 3 in a mated state.

FIG. 8 schematically depicts the circuit board 100 fully advanced such that the circuit board optical connector 140 is fully mated to the backplane optical connector 120. The four non-parallel walls 121 of the ferrule element 122 are fully seated within the trapezoidal recess 146 of the receptacle body 141 such that they contact the four non-parallel walls 144 of the receptacle body 141. The shape of the non-parallel walls 121 of the ferrule element 122 and the non-parallel walls 144 of the receptacle body 141, as well as the placement of the respective magnets 128, 145, align the array of lenses 149 of the receptacle body 141 with respect to the array of lenses 129 of the ferrule element 122. In this manner, the array of lenses 149 of the receptacle body 141 is optically coupled to the array of lenses 129 of the ferrule element 122.

Figure 9:
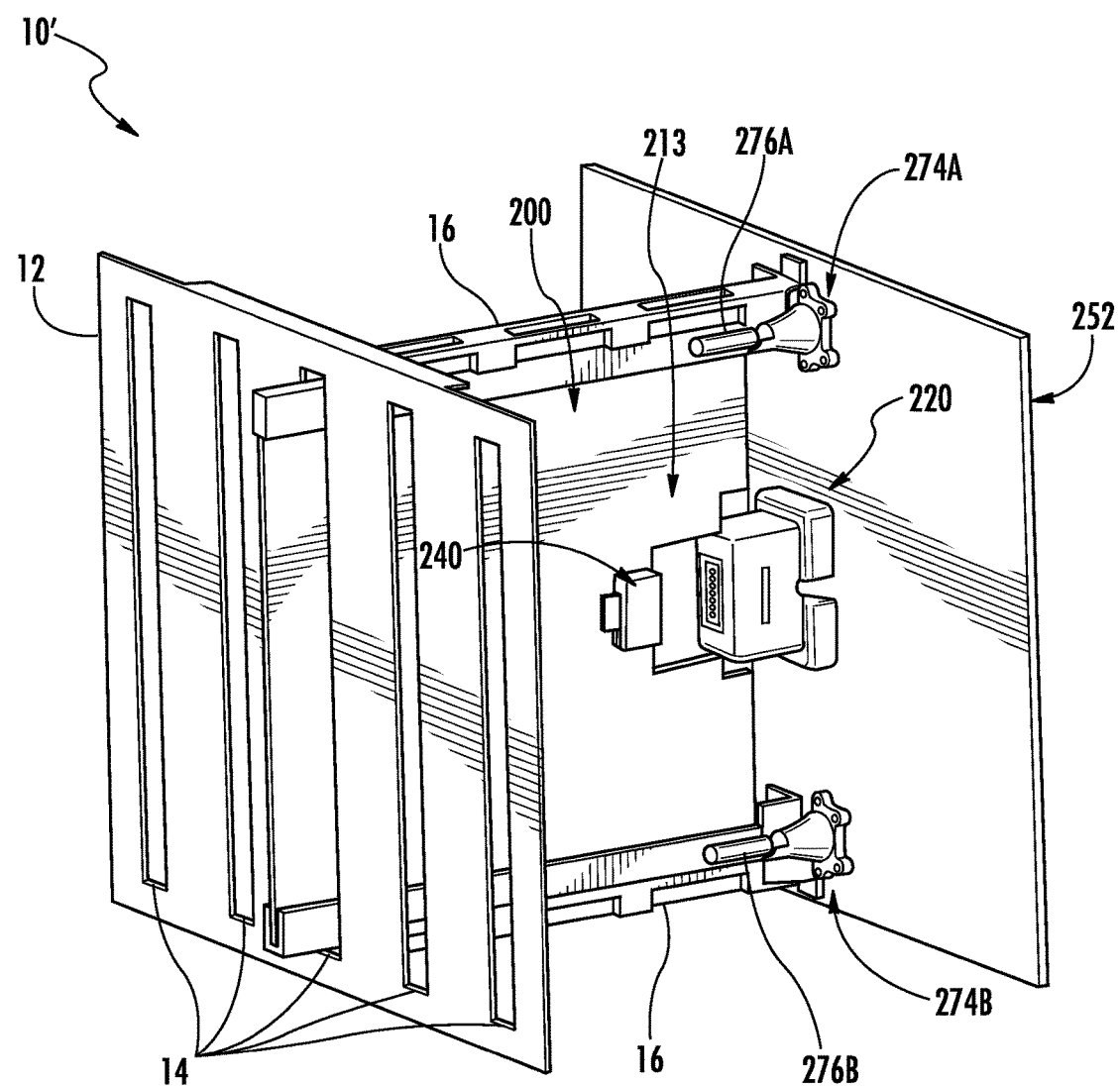
FIG. 9 schematically depicts a perspective view of another example equipment rack comprising an example circuit board and an example backplane according to one or more embodiments described and illustrated herein.

FIG. 9 schematically depicts an equipment rack 10' that may also be employed in a data distribution centers or telecommunication applications, for example. Similar to the equipment rack 10 depicted in FIG. 1, the example equipment rack 10' includes a faceplate 12 having slots 14 operable to receive circuit boards 200 along rails 16. The circuit board 200 is optically coupled to the backplane 250 by an optical connection 213. The backplane 250 and circuit board 200 may be similarly configured as the backplane 150 and the circuit board 100 described above. The example equipment rack 10' depicted in FIG. 9 has additional components for alignment between the circuit board 200 and the backplane 250 to optically couple the mated arrays of lenses, as described in more detail below.

Figure 10:
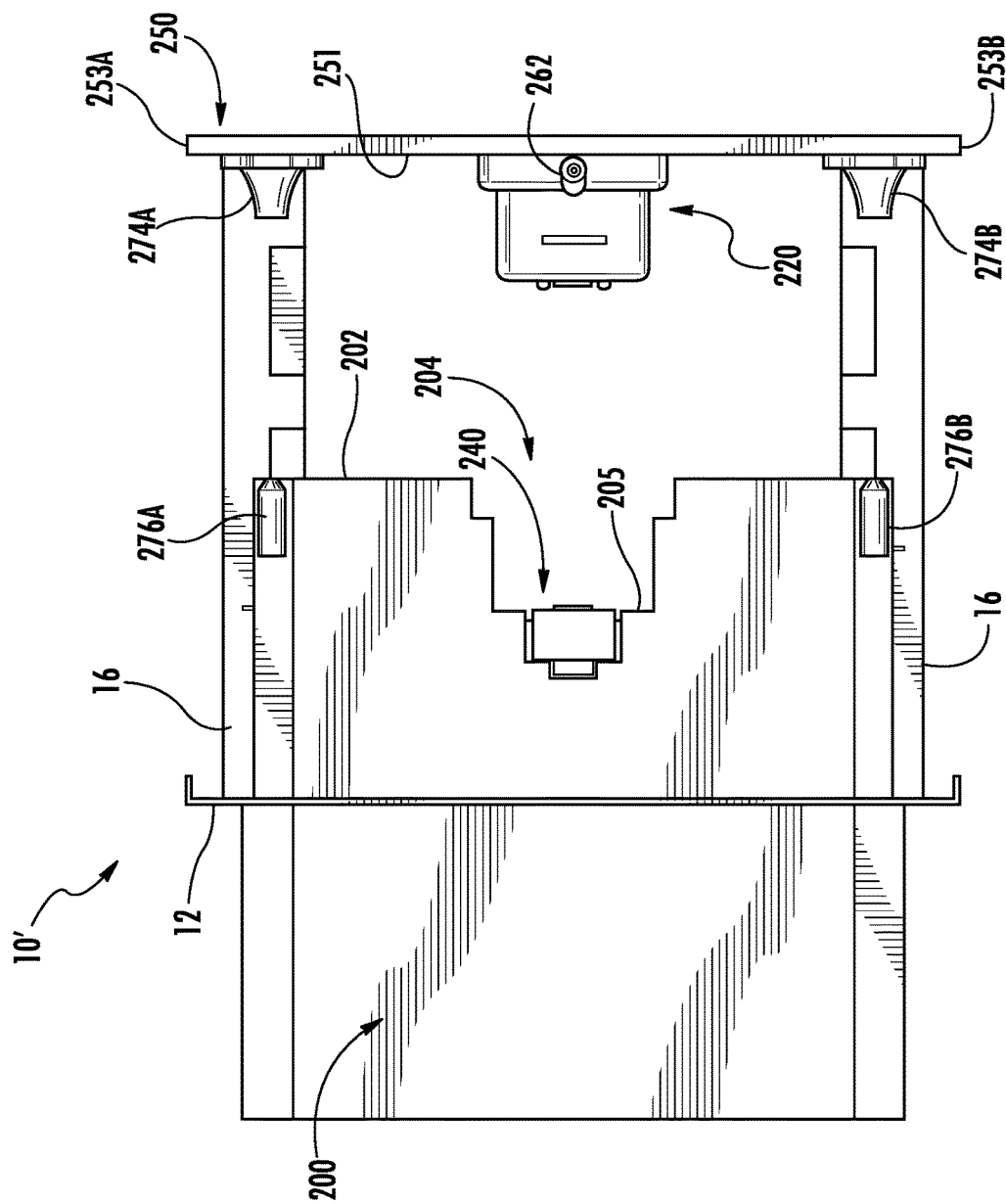
FIG. 10 schematically depicts a side view of the circuit board and the backplane depicted in FIG. 9 in an unmated state.

FIG. 10 is a side view of the example rack 10' depicted in FIG. 9. Referring to both FIG. 9 and FIG. 10, an example circuit board optical connector 240 is coupled to an edge 202 of the circuit board 200, and an example backplane optical connector 220 is coupled to a surface 251 of the backplane 250. Additionally, an example first alignment receptacle 274A is positioned at the surface 251 of the backplane 250 at a first edge 253A, and an example second alignment receptacle 274B is positioned at the surface 251 of the backplane 250 at a second edge 253B that is opposite from the first edge 253A.

A first alignment pin 276A and a second alignment pin 276B are located at the edge 202 of the circuit board 200 such that the first alignment pin 276A and the second alignment pin 276B are disposed within the first alignment receptacle 274A and the second alignment receptacle 274B, respectively, when the circuit board 200 is inserted into the equipment rack 10' and the circuit board optical connector 240 is mated with the backplane optical connector 220. The first and second alignment pins 276A, 276B and the first and second alignment receptacles 274A, 274B provide for coarse alignment between the circuit board optical connector 240 and the backplane optical connector 220. The first and second alignment receptacles 274A, 274B may be any component having bore or opening operable to receive the first and second alignment pins 276A, 276B. It should be understood that the first and second alignment pins 276A, 276B and the first and second alignment receptacles 274A, 274B may take on configurations other than those depicted in FIGS. 9 and 10. For example, the first and second alignment receptacles 274A, 274B may be configured as openings or recesses within the backplane 250. The first and second alignment pins 276A, 276B may provide additional functionality, such as providing a ground connection, a power connection and/or a data connection. Further, each alignment pin may be configured as an array of multiple alignment pins, for example.

Figure 11:
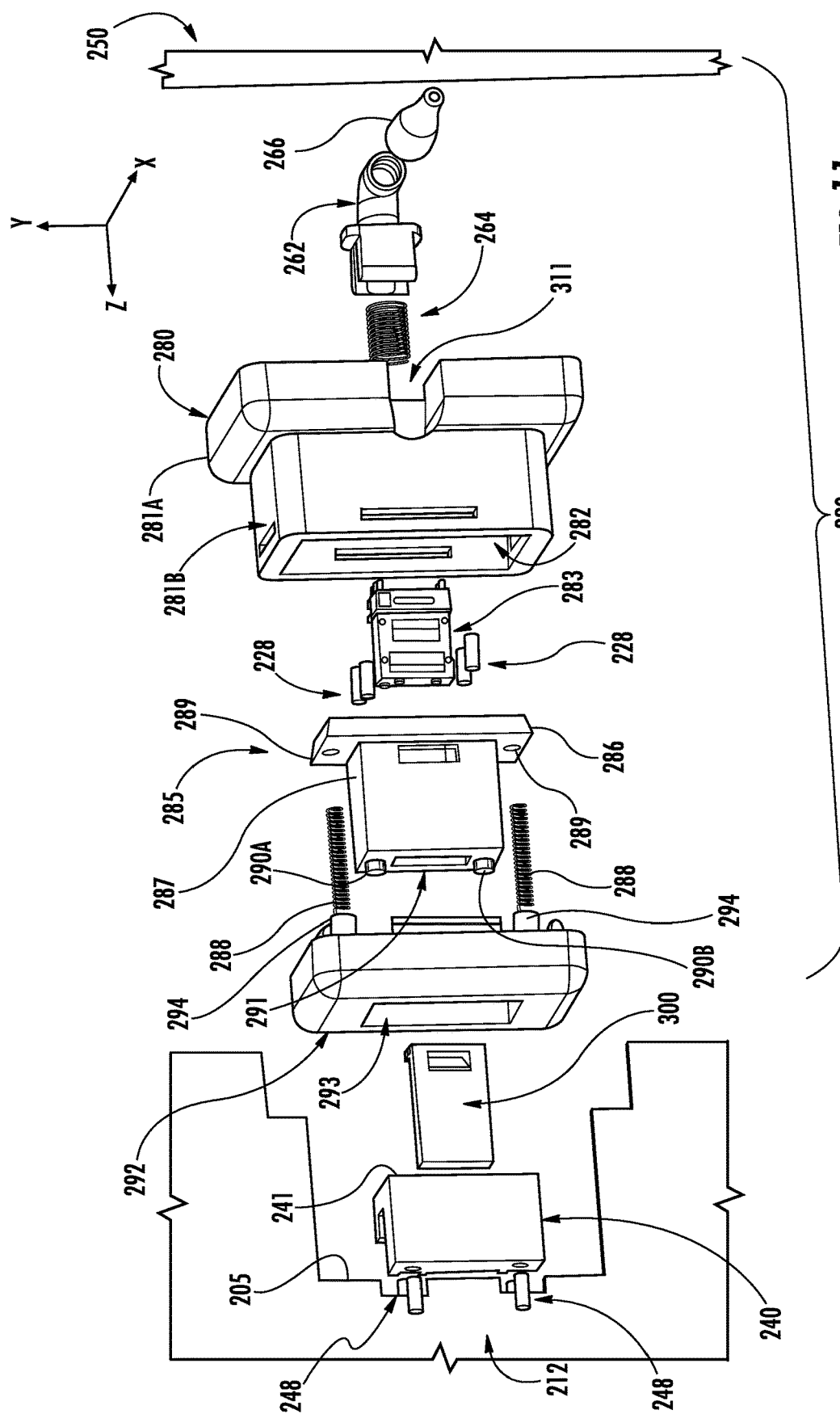
FIG. 11 schematically depicts an exploded perspective view of the example circuit board, the example circuit board optical connector, the example backplane, and the example backplane optical connector depicted in FIGS. 9 and 10 according to one or more embodiments described and illustrated herein.

FIG. 11 schematically depicts an example circuit board 200, an example circuit board optical connector 240, an example backplane optical connector 220, and an example backplane 250 in an exploded perspective view. The illustrated circuit board optical connector 240 includes an example receptacle housing 241, and a receptacle body 300 disposed within a receptacle opening (not visible in FIG. 11) of the receptacle housing 241. Four receptacle magnets 248 are disposed in bores 247 through the receptacle housing 241 (see FIG. 13B). It should be understood that more or few than four receptacle magnets 248 may be utilized.

Figure 13A:
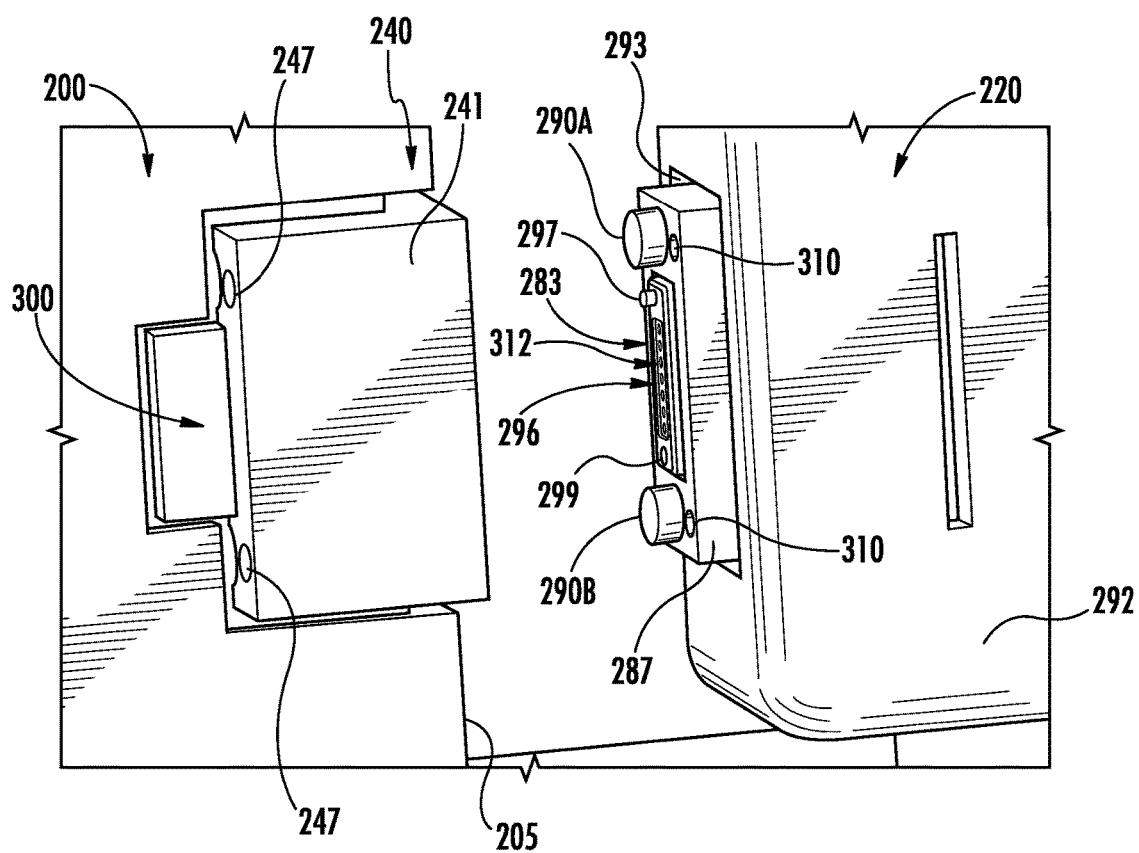
FIG. 13A depicts a close-up view of the example backplane optical connector depicted in FIGS. 9-12B according to one or more embodiments described and illustrated herein.
Figure 13B:
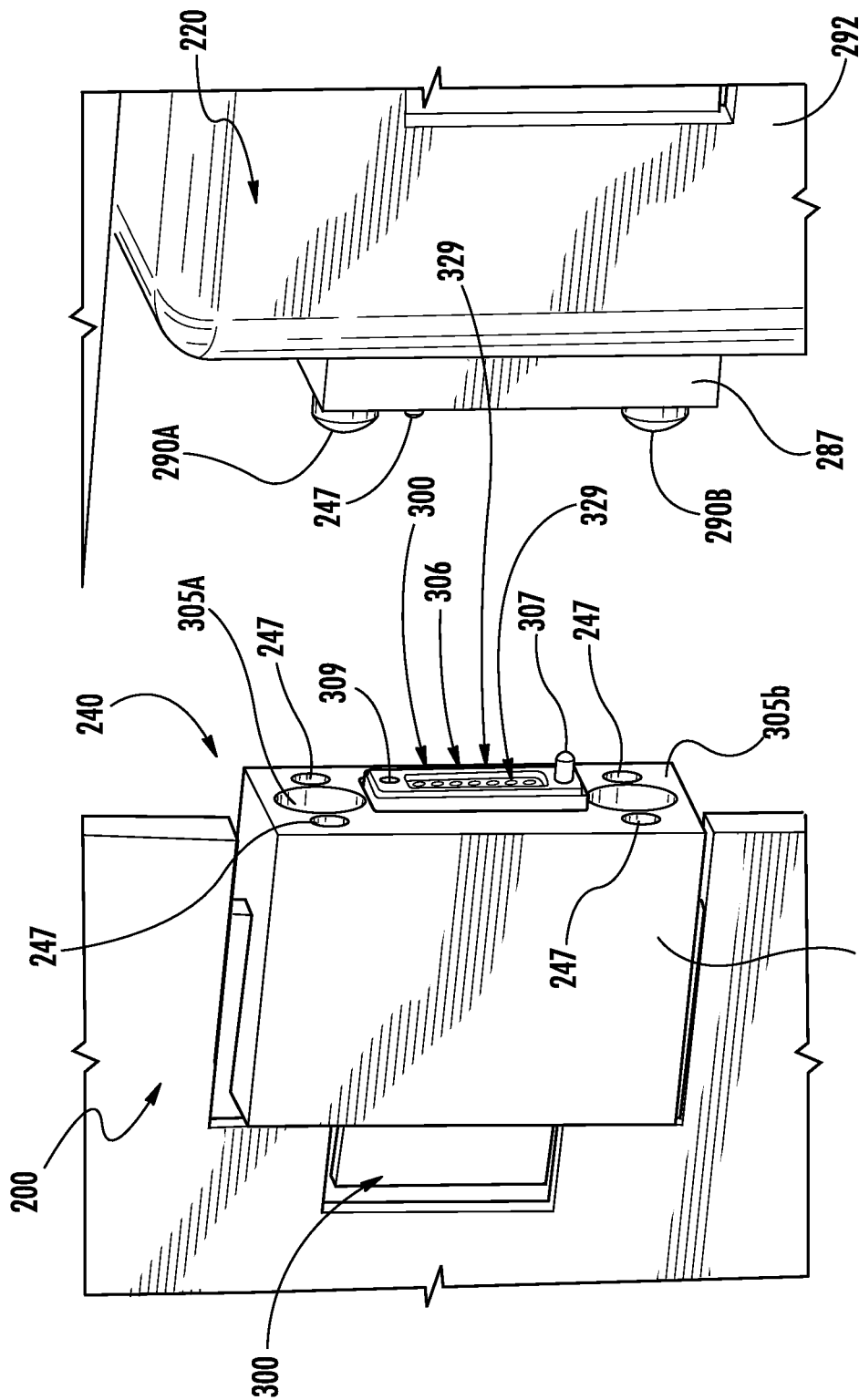
FIG. 13B depicts a close-up view of the example circuit board optical connector depicted in FIGS. 9-12B according to one or more embodiments described and illustrated herein.

Referring briefly to FIG. 13B, the receptacle body 300 is disposed within the receptacle housing 241 such that it partially extends beyond the receptacle housing 241. The receptacle housing 241 further comprises a first alignment bore 305A and a second alignment bore 305B adjacent the receptacle body 300. As described in more detail below, the first alignment bore 305A and the second alignment bore 305B are configured to receive a first alignment post 290A and a second alignment post 290B of the backplane optical connector 220.

The receptacle body 300 has a receptacle optical interface 306 comprising an array of lenses 329. The array of lenses 329 may be optically coupled to optical waveguides within the circuit board 200, as described above. The example receptacle optical interface 306 further comprises a first alignment feature 309 configured as a female bore and a second alignment feature 307 configured as a male pin that are operable to mate with corresponding first and second alignment features of a ferrule element 283 of the backplane optical connector 220.

The receptacle body 300 may be fabricated from an optically transmissive material as described above. Further, the receptacle body 300 may include internal optical fiber bores operable to receive optical waveguides (not shown), such as gradient-index lenses or optical fiber stubs. These waveguides within the receptacle body 300 may be optically coupled to the optical traces within the glass substrate and the array of lenses 329 of the receptacle body in embodiments.

Referring once again to FIG. 11, the example backplane optical connector 220 generally comprises an outer housing 280, a fiber guide element 262 within the outer housing 280, an inner housing 285 within the outer housing 280, a ferrule element 283 within inner housing 285, and a cap portion coupled to the outer housing 280.

The outer housing 280 comprises a base portion 281A and a body 281B extending from the base portion 281A. The base portion 281A is rigidly coupled to a surface 251 of the backplane 250 (e.g., by an adhesive). The body 281B includes an outer housing opening 282.

The inner housing 285 is disposed within the outer housing opening 282. The example inner housing 285 includes a flange portion 286 and a body portion 287 extending from the flange portion 286. The flange portion 286 includes two apertures 289 configured to receive two bias members 288, which may be configured as springs, for example. In the illustrated embodiment, four backplane magnets 228 are disposed within the inner housing (e.g., within bores 310 as shown in FIG. 13A). The body portion 287 of the inner housing 285 includes an inner housing opening 291. More or fewer backplane magnets 228 may be provided. The inner housing 285 further comprises a first alignment post 290A and a second alignment post 290B adjacent the inner housing opening 291. It should be understood that more or fewer alignment posts may be provided. Further, the inner housing may have female alignment bores rather than alignment posts as depicted in the figures.

Figure 14:
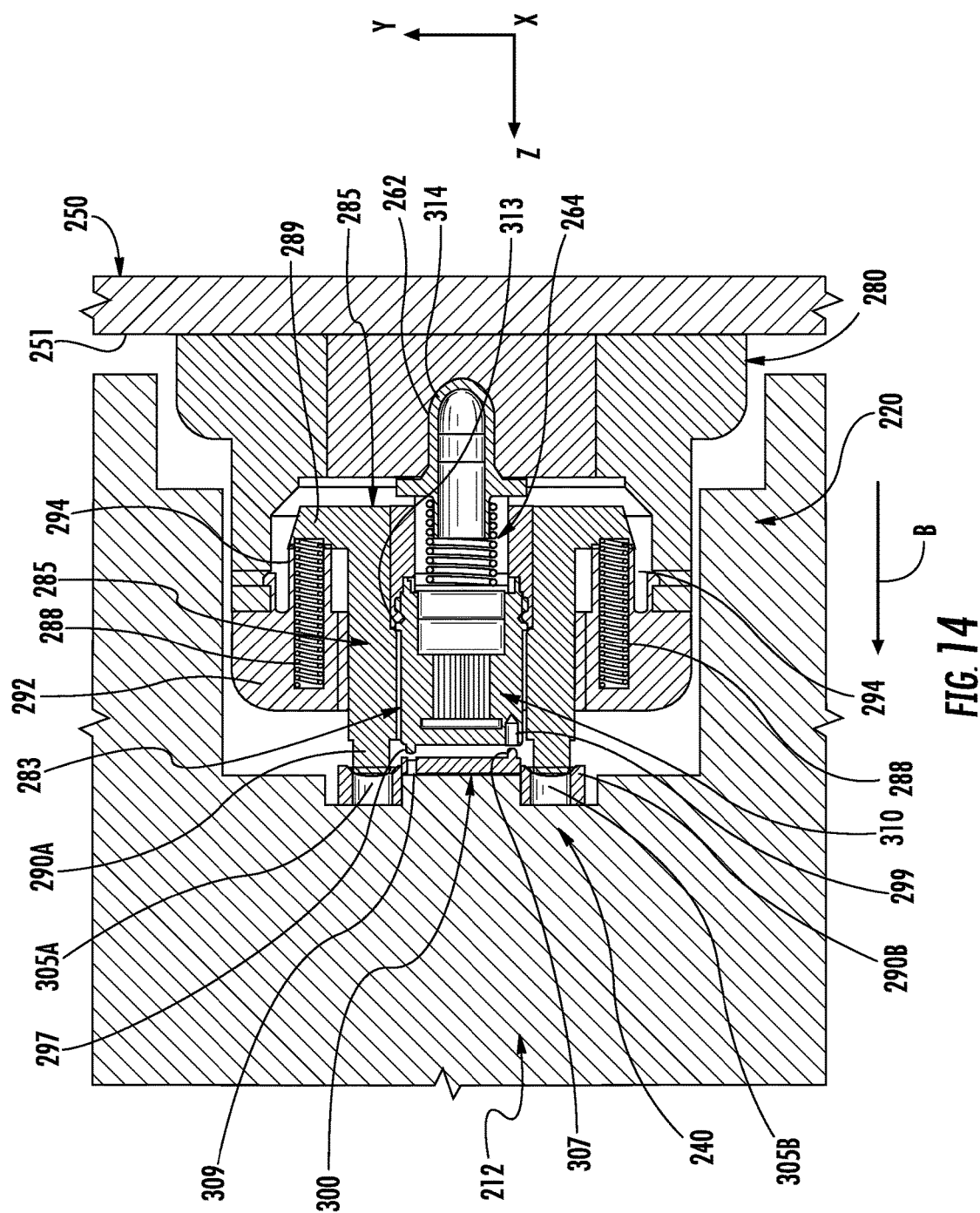
FIG. 14 schematically depicts a cross sectional side view of the example circuit board, the example circuit board optical connector, the example backplane, and the example backplane optical connector depicted in FIG. 9 in a partially mated state according to one or more embodiments described and illustrated herein.

Also disposed within the outer housing opening 282 of the outer housing 280 is the fiber guide element 262. The fiber guide element 262 is rigidly coupled to the housing (e.g., seated in a groove 314 as shown in FIG. 14), and is configured to introduce a plurality of optical fibers (not shown) into the backplane optical connector 220. The plurality of optical fibers is disposed within the fiber guide element. For example, the fiber guide element 262 may provide for a right angle turn through an opening 311 in the base portion 281A.

The ferrule element 283 is disposed within the inner housing opening 291 such that it is translatable with respect to the inner housing 285. Referring to both FIG. 11 and FIG. 12B, a bias member 264 is coupled to the ferrule element 283 and the fiber guide element 262. In other embodiments, the optical connector does not include a fiber guide element 262. In such embodiments, the bias member 264 may be coupled to the ferrule element 283 and the outer housing 280. Accordingly, the ferrule element 283 is operable to translate along the z-axis. The ferrule element 283 may also be free to slightly move about the x- and y-axis to allow mating with the circuit board optical connector 240.

Referring again to FIG. 11, the cap portion 292 is coupled to the body 281B (e.g., by adhesives, mechanical features, and the like). The example cap portion 292 includes bores 294 configured to receive the bias members 288. A portion of the inner housing 285 is disposed within an opening 293 of the cap portion 292. As stated above, the bias members 288 are also coupled to the inner housing 285 (e.g., at apertures 289). The inner housing 285 is translatable with respect to the outer housing 280 such that it may translate along the z-axis. The inner housing 285 may be disposed within the outer housing 280 so that it is also able to slightly move in the x- and y-axes. In this manner, the inner housing 285 may have play to properly mate with the receptacle body 300 of the circuit board optical connector 240.

Referring now to FIG. 13A, a portion of the body portion 287 of the inner housing 285 extends beyond a plane defined by the front face of the cap portion 292. The ferrule element 283 includes an optical interface 296 that includes an array of lenses 312. The example ferrule element 283 further includes a plurality of fiber bores 316 (see FIG. 12B) that receive a plurality of optical fibers (not shown). The plurality of optical fibers is optically coupled to the array of lenses 312 within the ferrule element 283. The ferrule element may be fabricated from an optically transmissive material so that optical signals may pass therethrough, as described above.

The optical interface 296 further includes a first alignment feature 297 configured as a male pin operable to be inserted into the bore of the first alignment feature 309 of the receptacle body 300 (see FIG. 13B) and a second alignment feature 299 configured as a female bore operable to receive the male pin of the second alignment feature 307 of the receptacle body 300 (see FIG. 13B).

Figure 12A:
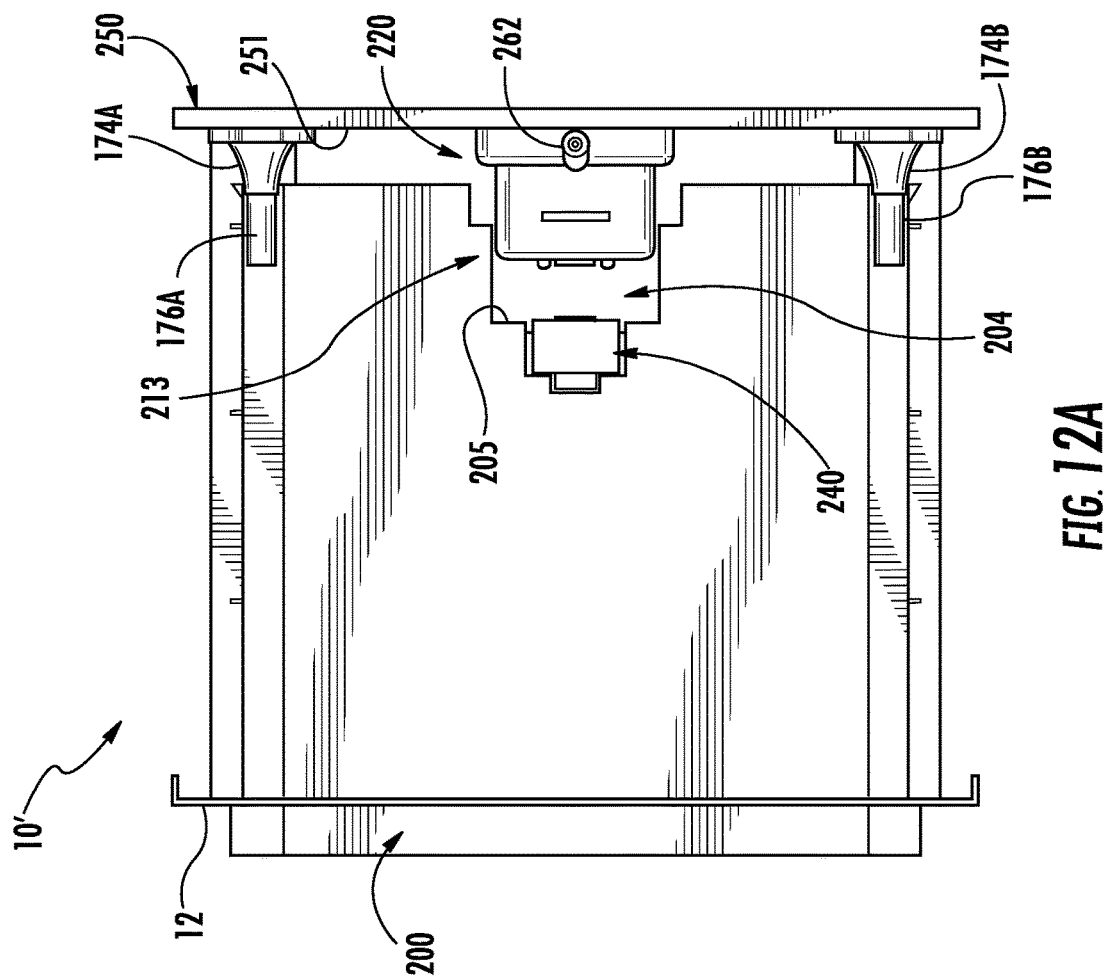
FIG. 12A schematically depicts a side view of the example circuit board, the example circuit board optical connector, the example backplane, and the example backplane optical connector depicted in FIG. 9 in a partially mated state.
Figure 12B:
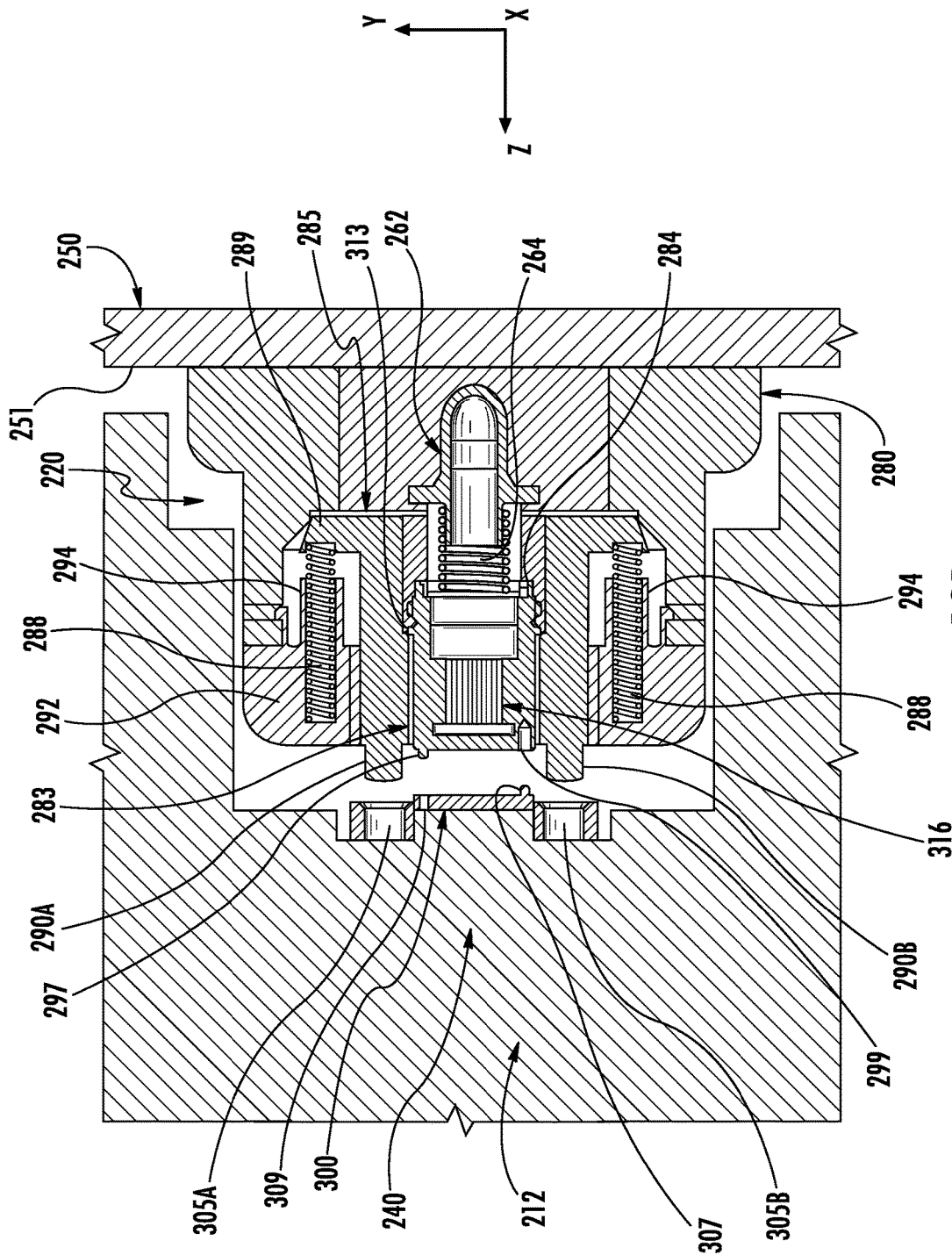
FIG. 12B schematically depicts a cross sectional side view of the example circuit board, the example circuit board optical connector, the example backplane, and the example backplane optical connector depicted in FIG. 9 in a partially mated state.

FIGS. 12A and 12B depict a circuit board 200 and a backplane 250 in a partially mated position. As shown in FIG. 12A, the first and second alignment pins 276A, 276B of the circuit board 200 are partially inserted into the first and second alignment receptacles 274A, 274B of the backplane 250 to provide coarse alignment between the circuit board optical connector 240 and the backplane optical connector 220. As noted hereinabove, FIGS. 13A and 13B depict respective alignment features of the circuit board optical connector 240 and the backplane optical connector 220. Referring to the cross sectional view of FIG. 12B, the inner housing 285 is in a retracted position within the outer housing 280 due to the compressive force applied by the bias members 288. The ferrule element 283 is in an advanced position in a positive direction along the z-axis. The ferrule element 283 of the illustrated embodiment is stopped by tabs 313 that contact an inner surface of the inner housing 285.

FIG. 14 schematically depicts a cross sectional view of the circuit board optical connector 240 being advanced toward the backplane optical connector 220. The ferrule element 283 is still in an advanced position within the inner housing 285. The magnetic attraction between the receptacle magnets 248 and backplane magnets 228 causes the inner housing 285 (and also the ferrule element 283 maintained within the inner housing 285) to translate in a positive direction along the z-axis as indicated by arrow B. The first and second alignment posts 290A, 290B of the inner housing 285 are shown as partially inserted into the first and second alignment bores 305A, 305B of the circuit board optical connector 240.

Figure 15A:
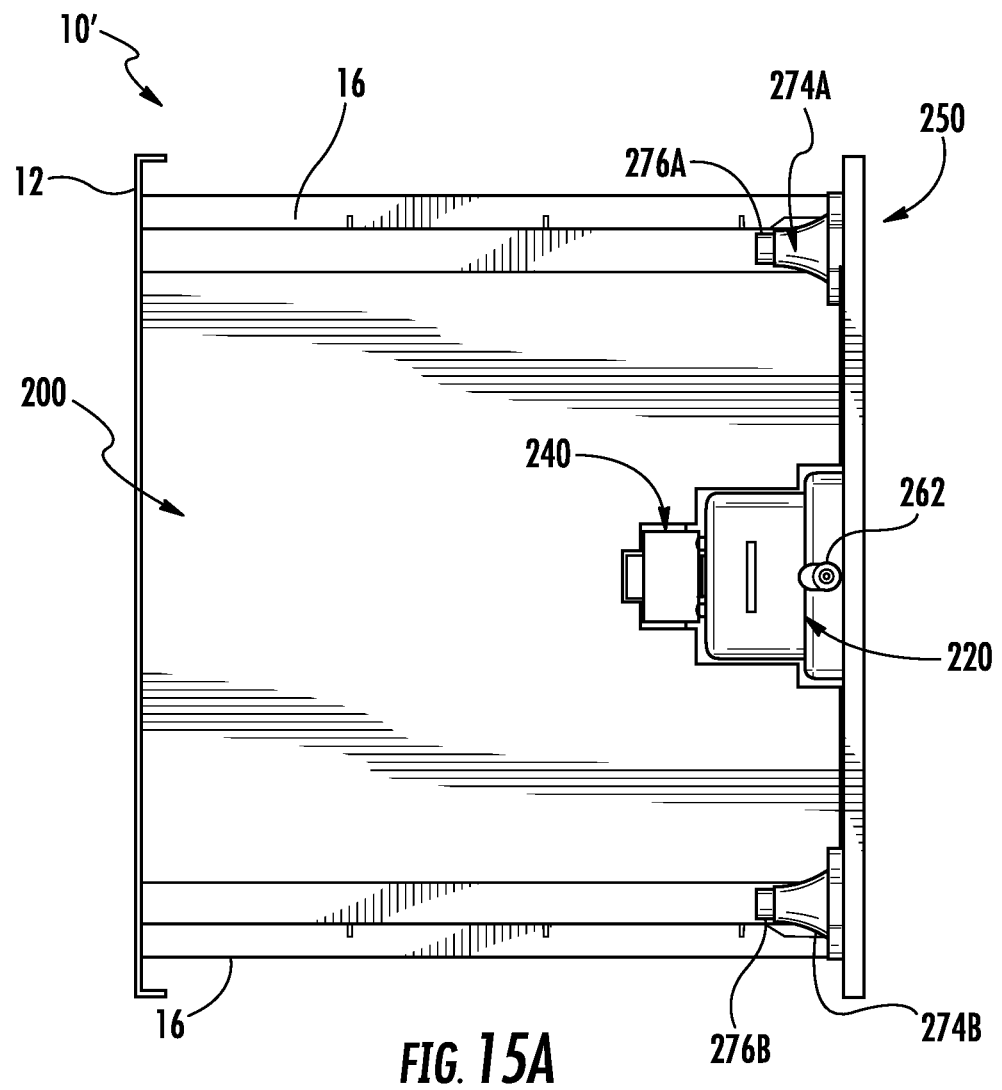
FIG. 15A schematically depicts a side view of the example circuit board, the example circuit board optical connector, the example backplane, and the example backplane optical connector depicted in FIG. 9 in a fully mated state according to one or more embodiments described and illustrated herein.
Figure 15B:
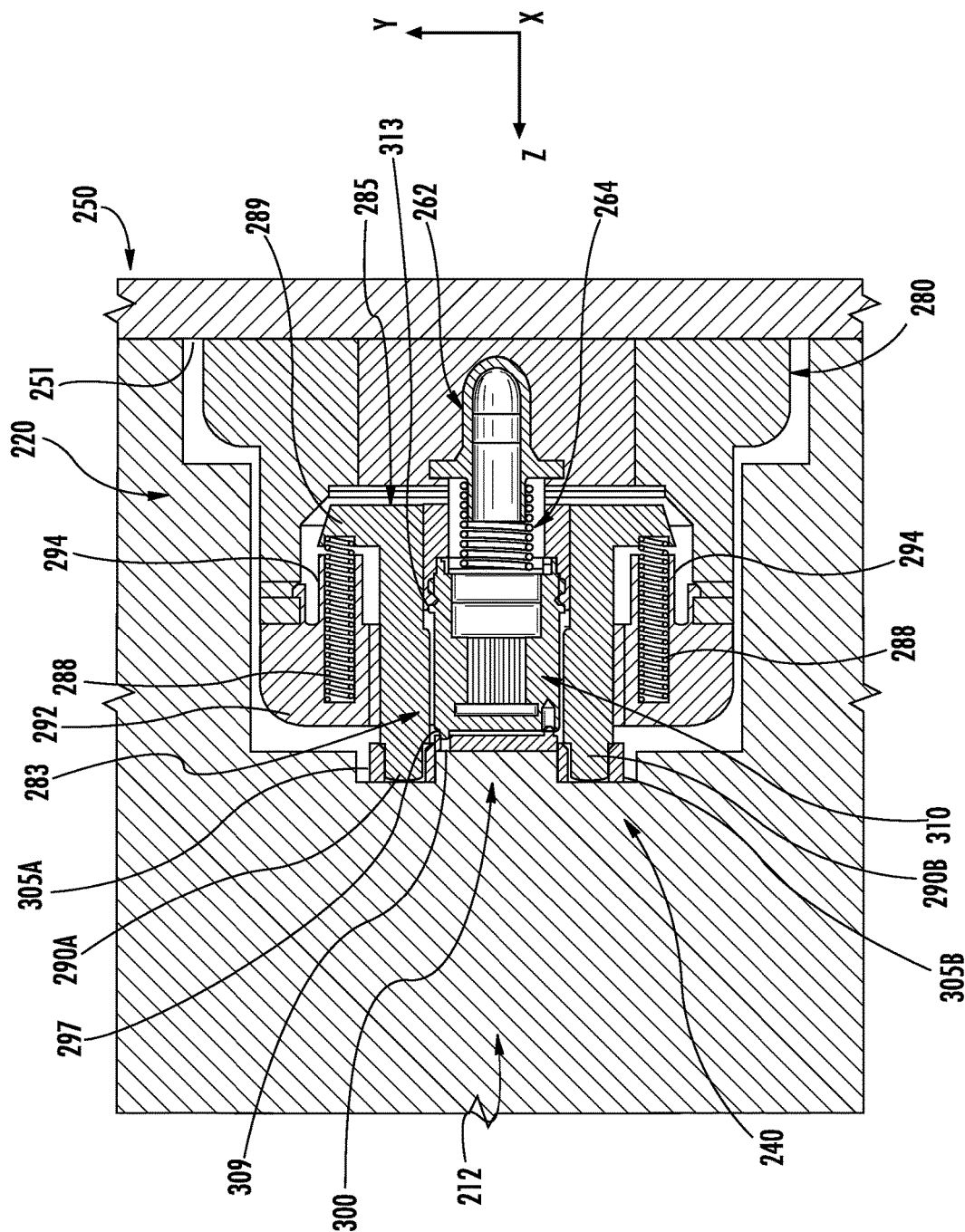
FIG. 15B schematically depicts a cross sectional side view of the example circuit board, the example circuit board optical connector, the example backplane, and the example backplane optical connector depicted in FIG. 9 in a fully mated state according to one or more embodiments described and illustrated herein.

FIGS. 15A and 15B depict the circuit board optical connector 240 fully coupled to the backplane optical connector 220. FIG. 15A is a side view of the circuit board 200 and the backplane 250, while FIG. 15B is a cross sectional view of the circuit board optical connector 240 and the backplane optical connector 220. The first and second alignment posts 290A, 290B are fully positioned within the first and second alignment bores 305, 307. The alignment features of the receptacle body 300 are mated with the alignment features of the ferrule element 283. The magnetic coupling between the circuit board optical connector 240 and the backplane optical connector 220 may cause the ferrule element to translate in a negative direction along the z-axis, as shown in FIG. 15B, causing the bias member 264 to become slightly compressed. When the circuit board optical connector 240 and the backplane optical connector 220 are fully mated as shown in FIGS. 15A and 15B, the array of lenses 329 of the receptacle body 300 is aligned and optically coupled to the array of lenses 312 of the ferrule element 283.

Figure 16:
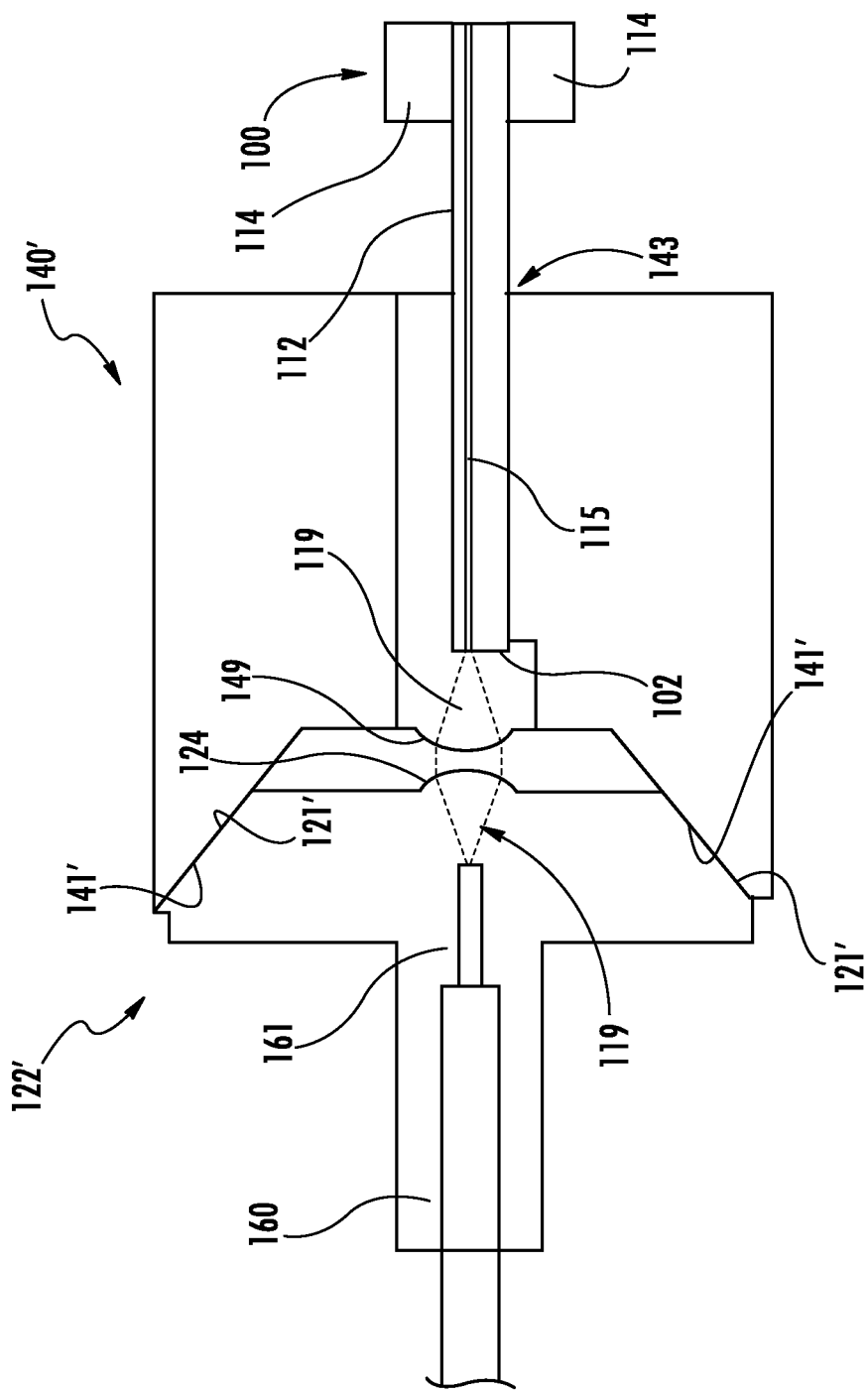
FIG. 16 schematically depicts an example ferrule element of an example backplane optical connector optically coupled to an example circuit board optical connector according to one or more embodiments described and illustrated herein.

Referring now to FIG. 16, mating between an example ferrule element 122' of a backplane optical connector (e.g., the backplane optical connector 120 depicted in FIGS. 1, 3, 5A and 5B) and an example circuit board optical connector 140' is schematically illustrated. The example ferrule element 122' and circuit board optical connector 140' have corresponding trapezoidal interfaces, as described above. The walls 121' of the ferrule element 122' contact the walls 141' of the circuit board optical connector 140'. The shape of the walls 121', 141' aligns array of lenses 129 of the ferrule element 122' with the array of lenses 149 of the circuit board optical connector 140'. Magnetic attraction maintains the mated relationship between the ferrule element 122' and the circuit board optical connector 140'.

The glass substrate 112 of the circuit board 100 is inserted to a notch 143 of the circuit board optical connector 140' such that a plurality of optical waveguides disposed on or within the glass substrate 112 are aligned and optically coupled to the array of lenses 149.

A plurality of optical fibers 160 is disposed within the ferrule element 122' within a plurality of fiber bores. A stripped end 161 of the optical fibers is located proximate the array of lenses 129.

During mating, there is a gap between the array of lenses 129 of the ferrule element 122' and the array of lenses 149 of the circuit board optical connector 140'. As shown in FIG. 16, diverging optical signals 119 emitted from the end 161 of the optical fibers 160 are collimated by the array of lenses 129. The optical signals 119 are then focused by the array of lenses 149 of the circuit board optical connector 140' into the optical traces 115. Conversely, diverging optical signals 119 emitted from the optical traces 115 of the glass substrate 112 are collimated by the array of lenses 149 of the circuit board optical connector 140'. The optical signals are then focused by the array of lenses 129 of the ferrule element 122' into the ends 161 of the optical fibers 160.

It will be apparent to those skilled in the art that various modifications and variations can be made without departing from the spirit or scope of the disclosure. Since modifications combinations, sub-combinations and variations of the disclosed embodiments incorporating the spirit and substance of the disclosure may occur to persons skilled in the art, the disclosure should be construed to include everything within the scope of the appended claims and their equivalents.

What is claimed is:

1. An optical connection comprising:
   a circuit board comprising an edge;
   a circuit board optical connector coupled to the edge of the circuit board, the circuit board optical connector comprising:
      a receptacle body comprising a receptacle optical interface;
      at least two receptacle magnets; and
      a bias member;
   a backplane comprising a surface; and
   a backplane optical connector positioned at the surface of the backplane, the backplane optical connector comprising:
      a ferrule element comprising an optical interface, wherein the ferrule element is movable relative to the backplane; and
      at least two backplane magnets,
   wherein the bias member engages the ferrule element such that the bias member applies a force on the ferrule element during an unmated state to maintain the ferrule element in a retracted state with respect to the backplane.

2. The optical connection of claim 1, wherein when the receptacle optical interface of the circuit board optical connector is positioned proximate the optical interface of the ferrule element, magnetic attraction between the at least two receptacle magnets and the at least two backplane magnets moves the ferrule element toward the receptacle body such that the optical interface of the ferrule element is optically coupled with the receptacle optical interface of the receptacle body.

3. The optical connection of claim 1, wherein:
   the ferrule element further comprises:
      a body portion comprising the optical interface;
      at least two bores positioned through the body portion;
      at least two posts extending from the body portion; and
      a fiber inlet portion extending from the body portion, the fiber inlet portion comprising a fiber receiving opening;
   wherein the bias member engages the at least two posts; and
   wherein the at least two backplane magnets are within the at least two bores.

4. The optical connection of claim 3, wherein the backplane comprises an opening for each of the at least two posts and the fiber inlet portion of the ferrule element, and the at least two posts and the fiber inlet portion of the ferrule element are disposed within the openings in the backplane such that the ferrule element is movable with respect to the backplane.

5. The optical connection of claim 3, wherein:
   the body portion comprises four non-parallel walls defining a trapezoidal shape; and
   and the receptacle body comprises four non-parallel walls defining a trapezoidal recess corresponding to the trapezoidal shape of the body portion.

6. The optical connection of claim 3, wherein:
   the bias member is a strip of a compliant material comprising a first end, a second end and a bent portion disposed between the first end and the second end;
   the strip further comprises a first opening at the first end, a second opening at the second end and a third opening at the bent portion;
   the at least two posts comprises a first post and a second post; and
   the first post is disposed through the first opening at the first end, the second post is disposed through the second opening at the second end, and the fiber inlet portion is disposed through the third opening at the bent portion.

7. The optical connection of claim 3, further comprising at least two bushings disposed within the openings of the backplane and about each of the at least two posts.

8. The optical connection of claim 1, wherein:
   the receptacle body further comprises a notch; and
   the edge of the circuit board is disposed within the notch of the receptacle body.

9. The optical connection of claim 1, wherein:
   the circuit board comprises a glass substrate comprising a plurality of waveguides positioned within the glass substrate;
   the receptacle optical interface comprises an array of lenses; and
   the receptacle body is coupled to the edge of the circuit board such that the plurality of waveguides are optically coupled to the array of lenses.

10. The optical connection of claim 9, wherein the circuit board further comprises one or more of an optical transmitter device and an optical receiver device optically coupled to one or more waveguides of the plurality of waveguides.

11. The optical connection of claim 1, wherein:
    the backplane optical connector further comprises:
       an outer housing comprising an outer housing opening positioned within the outer housing;
       an inner housing comprising a mating surface and an inner housing opening positioned within the inner housing, wherein the inner housing is disposed within the outer housing opening; and
       a cap portion comprising a cap opening, wherein the cap portion is coupled to the outer housing, and the inner housing is disposed within the cap opening;
    the ferrule element is disposed within the inner housing opening, and the ferrule element is translatable with respect to the inner housing;
    the at least two backplane magnets are disposed within the inner housing; and
    the outer housing is coupled to the surface of the backplane, and the inner housing and the ferrule element are movable with respect to the backplane.

12. The optical connection of claim 11, wherein:
    the circuit board optical connector further comprises a receptacle housing comprising a receptacle opening;
    the receptacle body is disposed within the receptacle opening; and
    the at least two receptacle magnets are disposed within the receptacle housing.

13. The optical connection of claim 12, wherein:
    the inner housing further comprises a first alignment post and a second alignment post at the mating surface; and
    the receptacle housing further comprises a first alignment bore and a second alignment bore that are configured to receive the first alignment post and the second alignment post of the inner housing, respectively.

14. The optical connection of claim 13, wherein:
    the ferrule element further comprises a first alignment feature and a second alignment feature at the optical interface; and
    the receptacle body further comprises a first alignment feature and a second alignment feature at the receptacle optical interface that are configured to mate with the first alignment feature and the second alignment feature of the ferrule element.

15. The optical connection of claim 14, wherein when the receptacle optical interface of the circuit board optical connector is positioned proximate the optical interface of the ferrule element:
   magnetic attraction between the at least two receptacle magnets and the at least two backplane magnets moves the inner housing of the backplane optical connector toward the receptacle body in a first direction;
   the first and second alignment features of the ferrule element mate with the first and second alignment features of the receptacle body;
   the first and second alignment posts of the inner housing are positioned within the first and second alignment bores of the receptacle housing; and
   the optical interface of the ferrule element optically coupled with the receptacle optical interface of the receptacle body.

16. The optical connection of claim 15, further comprising:
   a first alignment receptacle positioned on the surface of the backplane at a first edge;
   a second alignment receptacle positioned on the surface of the backplane at a second edge opposite from the first edge; and
   a first alignment pin and a second alignment pin located at the edge of the circuit board such that the first alignment pin and the second alignment pin are disposed within the first alignment receptacle and the second alignment receptacle when the optical interface of the ferrule element is in a mated position with respect to the receptacle optical interface of the receptacle body.

17. The optical connection of claim 11, wherein:
   the backplane optical connector further comprises at least one bias member disposed between the outer housing and the ferrule element, and at least one bias member disposed between the cap portion and the inner housing;
   the cap portion comprises a first bore and a second bore;
   the at least one bias member disposed between the cap portion and the inner housing comprises a first spring disposed within the first bore and a second spring disposed within the second bore of the cap portion; and
   the first spring and the second spring are coupled to the inner housing via a flange portion of the inner housing.

18. The optical connection of claim 11, wherein the backplane optical connector further comprises a fiber guide element operable to receive a plurality of optical fibers, wherein the fiber guide element is disposed within the outer housing opening and coupled to the outer housing, and the at least one bias member disposed between the outer housing and the ferrule element is coupled to the ferrule element and the fiber guide element.

19. The optical connection of claim 1, further comprising a fiber optic cable comprising a plurality of optical fibers, wherein the plurality of optical fibers is optically coupled to the optical interface.

20. The optical connection of claim 6, wherein:
   the fiber inlet portion comprises a groove; and
   the third opening of the strip is disposed around the groove of the fiber inlet portion.

* * * * *

UNITED STATES PATENT AND TRADEMARK OFFICE
CERTIFICATE OF CORRECTION

PATENT NO.         : 10,353,157 B2                          Page 1 of 1
APPLICATION NO.    : 14/950465
DATED              : July 16, 2019
INVENTOR(S)        : Davide Domenico Fortusini et al.

It is certified that error appears in the above-identified patent and that said Letters Patent is hereby corrected as shown below:

In the Claims

In Column 15, Line 58, Claim 5, before "the" delete "and".

Signed and Sealed this
Twenty-second Day of October, 2019

Andrei Iancu
*Director of the United States Patent and Trademark Office*